United States Patent
Kasuga et al.

(10) Patent No.: US 7,626,622 B2
(45) Date of Patent: Dec. 1, 2009

(54) SOLID STATE IMAGE PICKUP DEVICE AND CAMERA USING THE SAME

(75) Inventors: Shigetaka Kasuga, Osaka (JP); Takumi Yamaguchi, Kyoto (JP); Takahiko Murata, Osaka (JP); Yoshiyuki Matsunaga, Kanagawa (JP); Ryohei Miyagawa, Kyoto (JP); Atsushi Ueta, Osaka (JP)

(73) Assignee: Panasonic Corporation, Osaka (JP)

( * ) Notice: Subject to any disclaimer, the term of this patent is extended or adjusted under 35 U.S.C. 154(b) by 559 days.

(21) Appl. No.: 10/584,883

(22) PCT Filed: Jan. 11, 2005

(86) PCT No.: PCT/JP2005/000187
§ 371 (c)(1),
(2), (4) Date: Jun. 29, 2006

(87) PCT Pub. No.: WO2005/069608
PCT Pub. Date: Jul. 28, 2005

(65) Prior Publication Data
US 2009/0021619 A1    Jan. 22, 2009

(30) Foreign Application Priority Data
Jan. 13, 2004 (JP) ............................. 2004-006114
Jul. 6, 2004 (JP) ............................. 2004-199822

(51) Int. Cl.
H04N 5/335 (2006.01)
(52) U.S. Cl. ........................ 348/300; 348/302; 348/304; 348/308; 348/241; 348/243
(58) Field of Classification Search .................. 348/300, 348/302, 304, 308, 241, 243
See application file for complete search history.

(56) References Cited

U.S. PATENT DOCUMENTS

| 5,780,884 | A | 7/1998 | Kumagai et al. |
| 5,793,423 | A | 8/1998 | Hamasaki |
| 6,965,408 | B2 * | 11/2005 | Hiyama et al. ............... 348/308 |
| 7,224,390 | B2 * | 5/2007 | Kokubun et al. ............ 348/308 |
| 7,242,427 | B2 * | 7/2007 | Kokubun et al. ............ 348/241 |

(Continued)

FOREIGN PATENT DOCUMENTS

JP    62-185471    8/1987

(Continued)

*Primary Examiner*—David L Ometz
*Assistant Examiner*—Quang V Le
(74) *Attorney, Agent, or Firm*—Wenderoth, Lind & Ponack L.L.P.

(57) ABSTRACT

A solid state image pickup device 110 is provided with: a plurality of pixel units 10 that are arranged two-dimensionally and include a photoelectric conversion unit (photodiode PD) that converts light into a charge and an amplification unit (amplifier Q13) that converts the charge into a voltage and outputs it; a plurality of noise signal removal units (noise cancellation units 40) that are provided one for each column and remove noises contained in the voltage outputted from the amplifier Q31 of the pixel unit 10 belonging to the column; and a plurality of column amplification units (column amplifiers 70) that amplify the voltage outputted from the amplifier Q13 of the pixel unit 10 and output the amplified voltage to the noise cancellation unit 40, and enables increase in sensitivity and reduction in noise with low power consumption.

23 Claims, 21 Drawing Sheets

U.S. PATENT DOCUMENTS

| | | |
|---|---|---|
| 2001/0033337 A1 | 10/2001 | Sakuragi |
| 2002/0060586 A1* | 5/2002 | Watanabe .................... 327/94 |
| 2003/0117676 A1 | 6/2003 | Nakamura et al. |
| 2003/0151686 A1* | 8/2003 | Koyama .................... 348/304 |

FOREIGN PATENT DOCUMENTS

| | | |
|---|---|---|
| JP | 4-290081 | 10/1992 |
| JP | 6-217203 | 8/1994 |
| JP | 9-246516 | 9/1997 |
| JP | 11-196333 | 7/1999 |
| JP | 11-237665 | 8/1999 |
| JP | 11-266399 | 9/1999 |
| JP | 2001/251555 | 9/2001 |
| JP | 2002-152595 | 5/2002 |
| JP | 2003-046865 | 2/2003 |
| JP | 2003-163845 | 6/2003 |

* cited by examiner

SOLID STATE IMAGE PICKUP DEVICE AND CAMERA USING THE SAME

TECHNICAL FIELD

The present invention relates to a solid state image pickup device and a camera using the same, especially to a technology that enables increase in sensitivity and reduction in noise with low power consumption.

BACKGROUND ART

FIG. 1 is a view showing a circuit example of a conventional solid state image pickup device 900 comprising only N-type MOS.

The solid state image pickup device 900 shown in FIG. 1 adopts a structure such that the incident light is converted into a voltage by a pixel unit 10, the voltage variation caused among pixels is reduced by a noise cancellation unit 40, and the voltage is successively outputted by a signal output unit 50.

More specifically, as shown in FIG. 1, the solid state image pickup device 900 includes: a plurality of pixel units 10 (shown is one of them) that are arranged two-dimensionally; a plurality of noise cancellation units 40 (shown is one of them) provided one for each column; and the signal output unit 50.

The pixel unit 10 includes: a photodiode PD that converts the incident light into a charge; a transfer transistor Q11 that reads out the charge from the photodiode PD; a floating diffusion FD that temporarily accumulates the charge; a reset transistor Q12 that initializes the floating diffusion FD to a power supply voltage VDD; an amplifier Q13 (referred to also as a source follower SF) that detects the accumulated charge of the floating diffusion FD as a voltage; a row selection transistor Q14 that transfers the voltage outputted from the amplifier Q13, to a row signal line Ln for each row.

A load transistor Q21 is connected to the row signal line Ln. The incident light is converted into a voltage by the pixel unit 10, and is transferred to the succeeding noise cancellation unit 40.

The noise cancellation unit 40 includes a sample hold transistor Q31, a clamp transistor Q42, a clamp capacitor C41 and a sample hold capacitor C42, and obtains the difference between the initialization voltage of the floating diffusion FD detected by the pixel unit 10 and the voltage detected by the accumulated charge transferred from the photodiode PD to the floating diffusion FD, thereby detecting a signal component from which noise components are removed; the signal component is transferred to the succeeding signal output unit 50.

The signal output unit 50 includes a column selection transistor Q51 that successively selects the horizontal signal line Ln of each column, a horizontal signal line parasitic capacitor C51, a horizontal line initialization voltage RSD, a horizontal line initialization transistor Q52 and an output amplifier AMP, successively selects the signal component, of each column, from which the noise components are removed, and outputs it to the outside through the output amplifier AMP.

Next, the operation of the solid state image pickup device 900 will be described.

FIG. 2 is a chart showing the driving timing to drive the transistors of the solid state image pickup device 900.

At a time t0, a RESET pulse in the pixel unit 10 is turned on to supply the power supply voltage (VDD) to the floating diffusion FD. At this time, a signal (the node SIG1 of FIG. 1) from the source follower (SF) with the floating diffusion FD as the gate is supplied to one end (the node SIG2 of FIG. 1) of the capacitor C41 of the noise cancellation unit 40 by turning on a VSEL pulse and an NCSH pulse in the noise cancellation unit 40. At this time, by turning on an NCCL pulse at the same time, a constant clamping voltage (NCDC) is supplied to the other end (the node SIG3 of FIG. 1) of the capacitor C41, whereby the capacitor C41 is charged.

Then, at a time t2, the RESET pulse and the NCCL pulse are turned OFF.

At a time t3, the charge accumulated in the photodiode PD that converts light into an electric signal is transferred to the floating diffusion FD by turning on a TRAN pulse. By the potential of the floating diffusion FD being changed by $\Delta V1$ from the VDD level, the signal (the node SIG1 of FIG. 1) from SF is also changed by $\Delta V2$, and the signal where the variation among the threshold values of SFs is canceled is also supplied to one end (the node SIG2 of FIG. 1) of the capacitor C41 of the succeeding noise cancellation unit 40. Further, the signal (the node SIG3 of FIG. 1) at the other end of the capacitor C41 is also changed by a signal amount similar to $\Delta V2$; at this time, a capacitance distribution with the capacitor C42 connected to the same node occurs, and the actual signal change amount is reduced to a signal amount $\Delta V3$ which is the product of $\Delta V2$ and $C41/(C41+C42)$.

Then, at a time t4, the horizontal signal line (the node SIG4 of FIG. 1) in the signal output unit 50 is fixed at a constant voltage by turning on an RS pulse.

At a time t5, by turning on an HSEL pulse, the signal $\Delta V3$ charged to the capacitor C42 becomes a signal reduced to a signal amount $\Delta V4$ which is the product of $\Delta V3$ and $C42/(C42+C51)$, because of the capacitance distribution with the horizontal signal line parasitic capacitor C51, and is finally outputted from VOUT.

More specifically, at the time t1, the reset transistor Q12 of the pixel unit 10 is turned on by the RESET pulse to supply the power supply voltage VDD to the floating diffusion FD. At this time, the row selection transistor Q14 is turned on by the VSEL pulse to output a voltage (the node SIG1 of FIG. 1) corresponding to the charge of the floating diffusion FD from the source follower SF, and the sample hold transistor Q31 of the noise cancellation unit 40 is turned on by the NCSH pulse to supply the voltage to one end (the node SIG2 of FIG. 1) of the clamp capacitor C41 of the noise cancellation unit 40. At this time, the clamp transistor Q42 is turned on by the NCCL pulse at the same time to supply a constant clamping voltage NCDC to the other end (the node SIG3 of FIG. 1) of the clamp capacitor C41, whereby the clamp capacitor C41 is charged.

Next, at the time t2, the RESET pulse and the NCCL pulse are turned off.

At the time t3, the transfer transistor Q11 is turned on by the TRAN pulse to transfer the charge accumulated in the photodiode PD that converts light into an electric signal, to the floating diffusion FD. By the potential of the floating diffusion FD being changed by $\Delta V1$ from the VDD level, the signal (the node SIG1 of FIG. 1) from the source follower SF is changed by $\Delta V2$, and the signal where the variation among the threshold values of the source followers SF is canceled is also supplied to one end (the node SIG2 of FIG. 1) of the clamp capacitor C41 of the succeeding noise cancellation unit 40. Further, the signal (the node SIG3 of FIG. 1) at the other end of the clamp capacitor C41 is also changed by the signal amount similar to $\Delta V2$; at this time, a capacitance distribution with the clamp capacitor C41 connected-to the same node occurs, and the actual signal change amount is reduced to the signal amount $\Delta V3$ which is the product of $\Delta V2$ and $C41/(C41+C42)$.

Then, at the time t4, by turning on the horizontal line initialization transistor Q52 by the RS pulse, the horizontal signal line Lm (the node SIG4 of FIG. 1) in the signal output unit 50 is fixed at the constant voltage.

At the time t5, by turning on the column selection transistor Q51 by the HSEL pulse, the signal ΔV3 charged to the sample hold capacitor C42 becomes the signal reduced to the signal amount ΔV4 which is the product of ΔV3 and C42/(C42+C51), because of the capacitance distribution with the horizontal signal line parasitic capacitor C51, and is finally outputted from VOUT.

Patent Reference 1: Japanese Laid-Open Patent Application No. 2003-46865 (pages 1 to 8, FIG. 2)

DISCLOSURE OF INVENTION

Problems that Invention is to Solve

However, the conventional solid state image pickup device has the following problem:

The signal from SF with the floating diffusion FD as the gate is supplied to one end of the capacitor C41 of the noise cancellation 40, and at this time, the output signal ΔV2 (the node SIG1 of FIG. 1) from SF is reduced to approximately 0.8 to 0.9 times the voltage change amount ΔV1 of the floating diffusion. Further, a capacitance distribution occurs between the capacitor C41 and the capacitor C42 of the noise cancellation unit 40, so that the signal change amount (the node SIG3 of FIG. 1) to be detected is reduced to the signal amount ΔV3 which is the product of ΔV2 and C41/(C41+C51). Further, the signal ΔV3 charged to the capacitor C42 is read out to the horizontal signal line by the HSEL pulse in the signal output unit 50, and the horizontal signal line parasitic capacitor C51 cannot be ignored also here, so that the detected voltage becomes a signal (the node SIG4 of FIG. 1) reduced to a signal amount which is the product of ΔV3 and C42/(C42+C51). That is, as a solid state image pickup device, this device falls within the category extremely low in sensitivity and saturation power, and is poor in S/N ratio.

As described above, the signal change amount ΔV1 at the floating diffusion FD is reduced to approximately 0.2 to 0.3 of ΔV1 as the final output signal because of three significant factors, SF, the noise cancellation unit capacitance distribution and the horizontal signal line parasitic capacitor. To prevent this reduction, it is considered to increase the noise cancellation capacitors C41 and C42, particularly, increase the capacitor C41, and this method results in increase in chip area, which is a direct cause of increase in cost.

Accordingly, the present invention is made in view of the above-mentioned problem, and an object thereof is to provide a solid state image pickup device that enables increase in sensitivity, reduction in noise and the suppression of increase in the chip area with low power consumption.

Means to Solve the Problems

To attain the above-mentioned object, a solid state image pickup device according to the present invention is a solid state image pickup device for obtaining two-dimensional images, and is provided with: a plurality of pixel units that are arranged two-dimensionally and each include a photoelectric conversion unit operable to convert incident light into a charge and an amplification unit operable to convert the charge into a voltage and output the voltage; a plurality of noise signal removal units that are provided one for each column and operable to remove a noise contained in the voltage outputted from the amplification unit of the pixel unit belonging to the column; and a plurality of column amplification units operable to amplify the voltage outputted from the amplification unit of the pixel unit belonging to the column and output the amplified voltage to the noise signal removal unit corresponding to the column.

As described above, by incorporating the column amplification unit in a position between the pixel unit and the noise signal removal unit, the voltage outputted from the amplification unit of the pixel unit, that is, only the pixel signal can be amplified by N times, so that noise components such as thermal noises and 1/f noises caused at the noise signal removal unit and succeeding elements are not amplified and the S/N ratio is improved. Moreover, by amplifying the pixel signal by N times by the column amplification unit, an effect similar to reducing the capacitance of the noise signal removal unit to approximately 1/N times can be obtained, so that the increase in the chip area of the solid state image pickup device can be suppressed.

Moreover, the solid state image pickup device may be further provided with an impedance conversion unit operable to convert an impedance for the voltage outputted from the noise signal removal lo units; and an output signal amplification unit operable to amplify the voltage outputted from the impedance conversion unit.

As described above, by providing the circuit that prevents the capacitance distribution on the horizontal signal line, higher sensitivity and lower noise in the final output signal can be achieved. That is, by impedance-converting the output signal from the noise signal removal unit, a structure not affected by the succeeding circuit can be obtained.

Moreover, in the solid state image pickup device according to the present invention, the impedance conversion unit may be a source follower circuit.

Thereby, the impedance conversion unit can be realized with a simple structure.

Moreover, in the solid state image pickup device according to the present invention, each of the column amplification units may be provided with: an inverting amplifier; and a switching unit provided between an input terminal and an output terminal of the inverting amplifier.

Thereby, the variation in the threshold value of the MOS transistor of the inverting amplifier among the columns can be canceled.

Moreover, in the solid state image pickup device according to the present invention, each of the column amplification units may be provided with: a plurality of column amplification circuits having different amplification degrees; and a selection circuit that selects one of the column amplification circuits according to a level of the input voltage.

Thereby, the output signal can be made a more desirable one by largely amplifying it when the signal level of the pixel unit is low and amplifying it a little when the level is high.

Moreover, in the solid state image pickup device according to the present invention, the noise signal removal units may use a capacitance distribution method.

Thereby, the manufacturing process is facilitated.

Moreover, in the solid state image pickup device according to the present invention, each of the noise signal removal units may have a capacitor, and the capacitor may be an N-type MOS capacitor.

Thereby, the manufacturing process is facilitated.

Moreover, in the solid state image pickup device according to the present invention, transistors that the solid state image pickup device has may be all N-type MOS transistors.

Thereby, the manufacturing process is facilitated.

Moreover, the solid state image pickup device according to the present invention may be further provided with a boosting voltage application unit operable to apply, to a load circuit that each of the column amplification units has, a power supply voltage and a boosting voltage higher than the power supply voltage.

As described above, by incorporating the column amplification unit to which the boosting voltage higher than the power supply voltage is applied by the boosting voltage application unit in a position between the pixel unit and the noise signal removal unit, the voltage outputted from the amplification unit of the pixel unit, that is, only the pixel signal can be amplified by N times with excellent linearity, so that noise components such as thermal noises and 1/f noises caused at the noise signal removal unit and succeeding elements are not amplified and the S/N ratio is improved. Moreover, by amplifying the pixel signal by N times by the column amplification unit, an effect can be obtained similarly to reducing the capacitance of the noise signal removal unit to approximately 1/N times, so that the increase in the chip area of the solid state image pickup device can be suppressed.

Moreover, in the solid state image pickup device according to the present invention, the boosting voltage application unit may be a charge pump circuit that boosts the power supply voltage by a charge pump method.

Thereby, by generating the boosting voltage by the charge pump circuit, a large contribution can be made to reduced power consumption.

Moreover, in the solid state image pickup device according to the present invention, the charge pump circuit may boost the power supply voltage by using a driving pulse which selects a column.

Thereby, the boosting voltage can be easily generated without a pulse for boosting voltage generation being provided separately.

Moreover, in the solid state image pickup device according to the present invention, the boosting voltage application unit may be a bootstrap circuit that is provided within each of the column amplification units and applies, to the load circuit, the power supply voltage and the boosting voltage higher than the power supply voltage.

As described above, by providing the bootstrap circuit within each of the column amplification units, the action of suppressing the variation in the amplification degree of the column amplification unit can be provided, so that the longitudinal noise due to the variation in the amplification degree among the columns can be reduced.

Moreover, in the solid state image pickup device according to the present invention, the load circuit may be a first MOS transistor for load, the power supply voltage may be applied to a drain of the first MOS transistor, and the boosting voltage may be applied to a gate of the first MOS transistor.

Thereby, only the pixel signal can be amplified by N times with excellent linearity with a simple structure.

Moreover, in the solid state image pickup device according to the present invention, each of the column amplification units may have a second MOS transistor for driving, a source of the first MOS transistor may be connected to a drain of the second MOS transistor, the voltage outputted from the amplification unit of the pixel unit belonging to the column may be applied to a gate of the second MOS transistor through a clamp capacitance, and the voltage outputted from the amplification unit of the pixel unit belonging to the column may be amplified by an amplification degree determined by a ratio between resistance values of the first and second MOS transistors.

Thereby, only the pixel signal can be amplified by N times with excellent linearity, so that noise components such as thermal noises and 1/f noises caused at the noise signal removal unit and succeeding elements are not amplified and the S/N ratio is improved. Moreover, by amplifying the pixel signal by N times by the column amplification unit, an effect can be obtained similarly to reducing the capacitance of the noise signal removal unit to approximately 1/N times, so that the increase in the chip area of the solid state image pickup device can be suppressed.

Moreover, in the solid state image pickup device according to the present invention, each of the column amplification units may change the amplification degree according to an input level of the voltage outputted from the amplification unit of the pixel unit belonging to the column.

Thereby, by performing the most suitable amplification according to the quantity of incident light, images with excellent sensitivity such that dark parts are made bright and bright parts are made modest in brightness can be always generated.

Moreover, in the solid state image pickup device according to the present invention, each of the column amplification units may have a plurality of column amplification units having different amplification degrees; and a selection unit operable to select one of the column amplification units according to an input level of the voltage outputted from the amplification unit of the pixel unit belonging to the column.

Also by this, by switching to an amplifier having the most suitable amplification degree according to the quantity of incident light, images with excellent sensitivity can be always generated.

Moreover, in the solid state image pickup device according to the present invention, the column amplification units may increase the amplification degree as an input level of the voltage outputted from the amplification unit of the pixel unit belonging to the column decreases.

Thereby, the output signal can be made a more desirable one by largely amplifying it when the signal level of the pixel unit is low and amplifying it a little when the level is high.

Moreover, in the solid state image pickup device according to the present invention, each of the column amplification units may further have a third MOS transistor for making voltages at the drain and gate of the second MOS transistor the same, and initial state may be set by a threshold voltage of the second MOS transistor and a black level signal inputted to the column amplification units through the clamp capacitance from the amplification unit of the pixel unit.

Thereby, the variation in the threshold value of the second MOS transistor among the columns can be canceled.

Moreover, in the solid state image pickup device according to the present invention, each of the column amplification units may have an interruption unit operable to interrupt a drive current of the second MOS transistor except during a necessary operation period.

Thereby, higher sensitivity and lower noise can be realized with low power consumption.

Moreover, the solid state image pickup device according to the present invention may be further provided with an impedance conversion unit operable to convert an impedance for the voltage outputted from the noise signal removal units.

Thereby, by impedance-converting the output signal from the noise signal removal unit, a structure not affected by the succeeding circuit can be obtained.

Moreover, in the solid state image pickup device according to the present invention, the impedance conversion unit may be a source follower circuit structured by using an NMOS transistor.

Thereby, when structured by the NMOS transistor, the most excellent impedance conversion unit is obtained, the capacitance distribution on the horizontal signal line Lm can be prevented, and higher sensitivity and lower noise in the final output signal can be achieved.

Moreover, in the solid state image pickup device according to the present invention, the noise signal removal unit may have a capacitor, and the capacitor may be an N-type MOS capacitor.

Thereby, the manufacturing process of the solid state image pickup device is facilitated.

Moreover, in the solid state image pickup device according to the present invention, the transistors that the solid state image pickup device has may be all NMOS transistors.

Thereby, by the circuits being all N-type MOS circuits, the manufacturing process is facilitated, and the degradation in pixel characteristic due to a heat treatment in the course of the formation of P-type MOS is prevented, so that the characteristic of the image quality of the manufactured solid state image pickup device is excellent.

Moreover, in the solid state image pickup device according to the present invention, the column amplification units may be structured so as to be on a lower frequency side than a frequency band of the amplification units of the pixel units, and bandwidth-shape a noise frequency.

Thereby, the noise frequency can be bandwidth-shaped, so that the characteristic of the image quality becomes excellent.

Moreover, in the solid state image pickup device according to the present invention, the noise removal units may be structured so as to be on a lower frequency side than a frequency band of the amplification units of the pixel units, and bandwidth-shape a noise frequency.

Also by this, the noise frequency can be bandwidth-shaped, so that the characteristic of the image quality becomes excellent.

The present invention can be realized not only as such a solid state image pickup device but also as a camera including such a solid state image pickup device.

Thereby, noise components such as thermal noises and 1/f noises caused at the noise signal removal unit and succeeding elements are not amplified and the S/N ratio is improved, and by amplifying the pixel signal by N times by the column amplification unit, an effect can be obtained similarly to reducing the capacitance of the noise signal removal unit to approximately 1/N times, so that a camera can be realized in which the increase in the chip area of the solid state image pickup device can be suppressed and further, the linearity of the sensitivity characteristic can be enhanced.

EFFECTS OF THE INVENTION

As is apparent from the above description, according to the present invention, the linearity of the input and output gain characteristic is improved by the column amplification unit while the noise superimposed on the output signal from the pixel unit is small, the signal amount is increased after the dynamic range is widened and the signal is inputted to the succeeding noise signal removal unit, so that the improvement of S/N is achieved; further, by providing the circuit that impedance-converts the signal from the noise signal removal unit first of all, a circuit is provided that prevents the capacitance distribution on the horizontal signal line Lm to improve the gain. Further, in the column amplification unit, by interrupting the drive current except during the necessary operation period, higher sensitivity and lower noise are realized with low power consumption, so that not only the characteristic improvement but also the reduction in the area of the noise signal removal unit circuit is enabled.

Therefore, according to the present invention, for example, when scenes both inside a room where it is comparatively dark and outside the room where it is bright are photographed from inside the room, good-quality images with contrast can be generated for high-light-quantity parts outside the room; thus, the practical value of the invention of the present application is extremely high in these days when digital cameras have become widespread.

NUMERICAL REFERENCES

Figure 1:
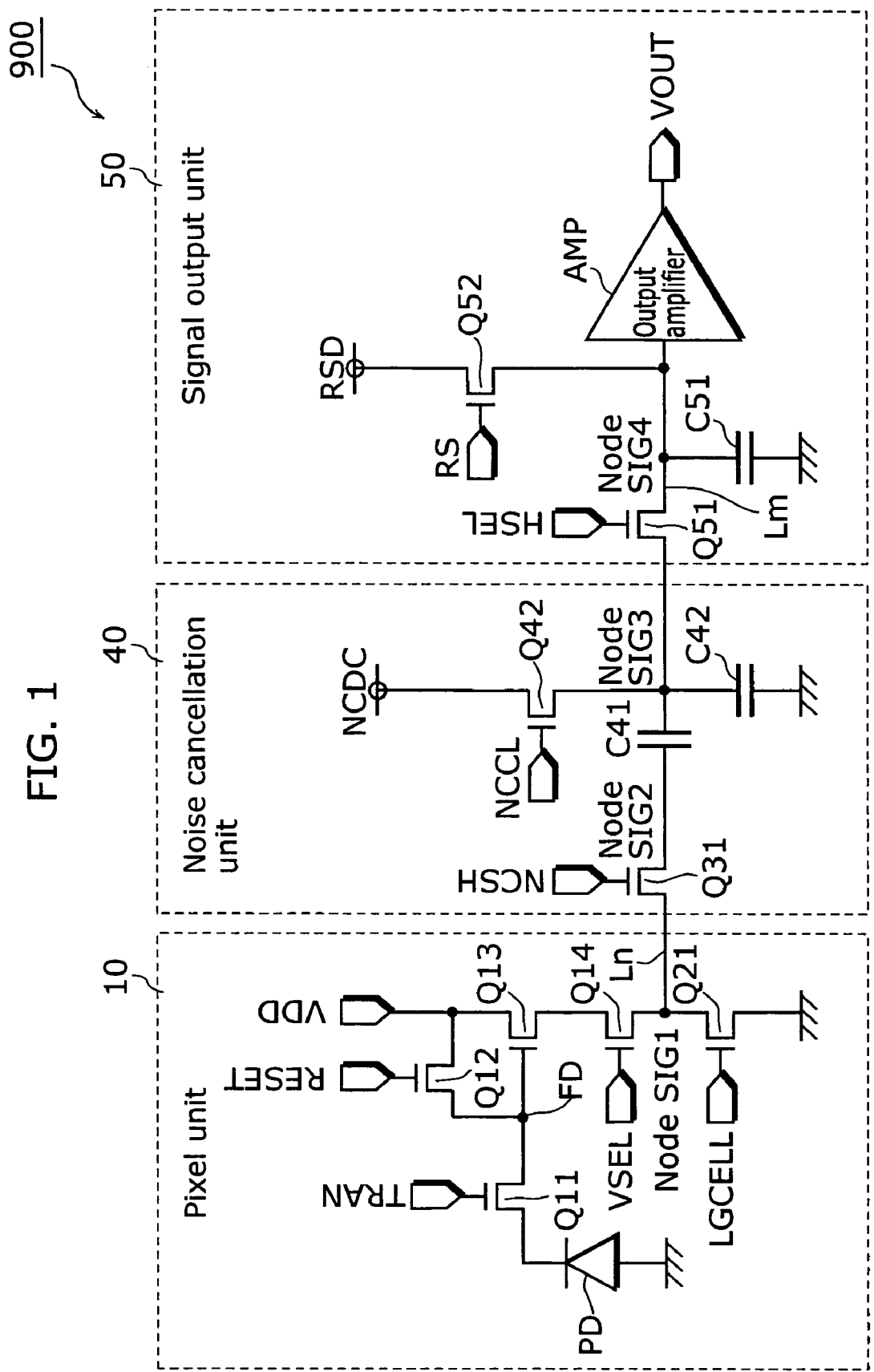
FIG. 1 A view showing the circuit example of the conventional solid state image pickup device 900 comprising only N-type MOS.

10 Pixel unit
40 Noise cancellation unit 50, 50a Signal output unit
60, 60a, 60b Pixel signal amplification unit
70, 70a, 70b Column amplifier (Column amplification unit)
71 Inverting amplification column amplifier (Column amplification unit)
80 Boosting circuit
80a Charge pump circuit
110, 120, 130, 140, 210,
220, 230, 240, 250, 260 Solid state image pickup device
PD Photodiode
FD Floating diffusion
COMP Comparator
Q52, Q71, Q72 Transistor
C41, C42, C51, CA Clamp capacitor

BEST MODE FOR CARRYING OUT THE INVENTION

Hereinafter, embodiments of the present invention will be described in detail by using drawings.

First Embodiment

Figure 3:
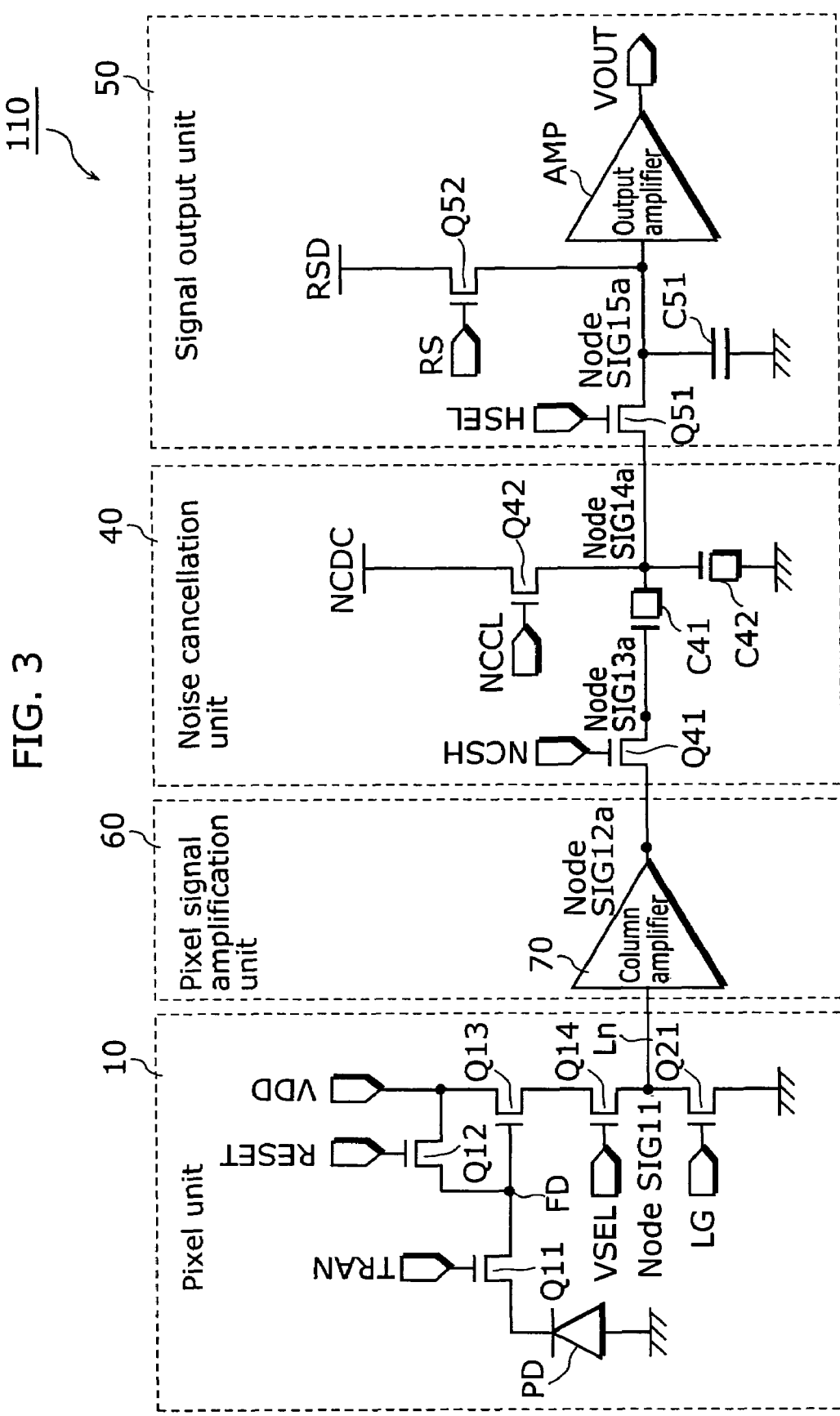
FIG. 3 A conceptual circuit diagram of an NMOS solid state image pickup device according to a first embodiment of the present invention.

FIG. 3 is a conceptual circuit diagram in which the circuit comprises only N-type MOS where the degradation in pixel characteristic due to a heat treatment in the course of the formation of P-type MOS according to a first embodiment of the present invention is prevented. In the figure, elements corresponding to those of the solid state image pickup device 900 shown in FIG. 1 are denoted by the same numerical references, and detailed descriptions thereof are omitted.

Figure 2:
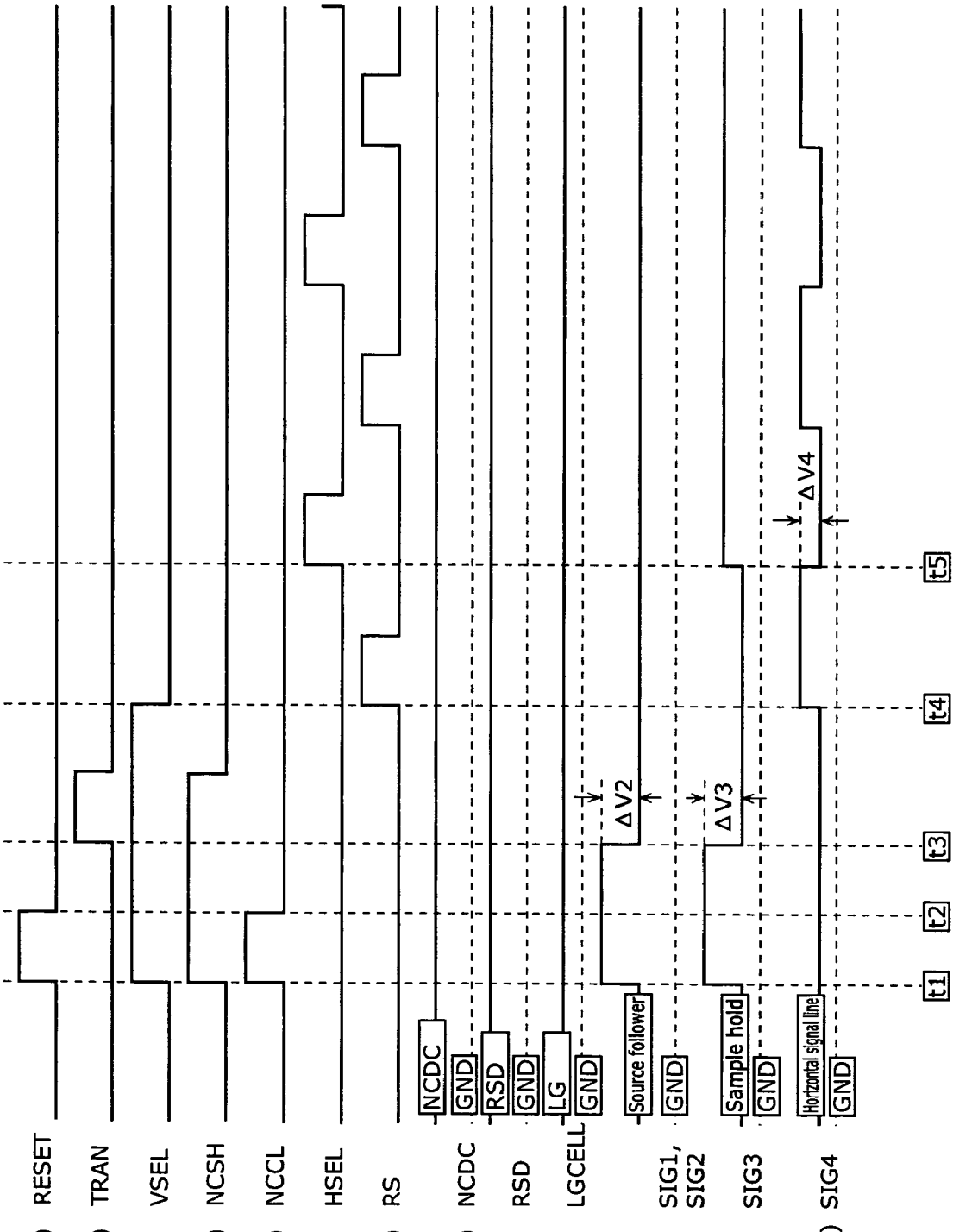
FIG. 2 A chart showing the driving timing to drive the transistors of the solid state image pickup device 900.

A solid state image pickup device 110 has a structure such that a pixel signal amplification unit 60 (that is, column amplifier 70) is inserted between the pixel unit 10 and the noise cancellation unit 40. The driving timing thereof is the same as that shown in FIG. 2.

That is, at the time t0, the RESET pulse is turned on to supply VDD to the floating diffusion FD. At this time, by turning on the VSEL pulse, the signal (the node SIG11 of FIG. 3) from SF with the floating diffusion FD as the gate is inputted to the succeeding column amplifier 70 for voltage amplification (the node SIG12a of FIG. 3), and further, by turning on the NCSH pulse, the signal is supplied to one end (the node SIG13a of FIG. 3) of the -capacitor C41 of the noise cancellation unit 40. At this time, by turning on the NCCL pulse at the same time, a constant clamping voltage (NCDC) is supplied to the other end (the node SIG14a of FIG. 3) of the capacitor C41, whereby the capacitor C41 is charged.

Then, at the time t2, the RESET pulse and the NCCL pulse are turned off.

At the time t3, the charge accumulated in the photodiode PD that converts light into an electric signal is transferred to the floating diffusion FD by turning on the TRAN pulse. By the potential of the floating diffusion FD being changed by Δ V1 from the VDD level, the signal (the node SIG11 of FIG. 3) from SF is also changed by Δ V2, and the signal where the variation among the threshold values of SFs is canceled is inputted to the succeeding column amplifier 70 to be amplified to an N-fold voltage and is supplied to one end (the node SIG13a of FIG. 3) of the capacitor C41 of the noise cancellation unit 40. Thereby, the signal (the node SIG14a of FIG. 3) at the other end of the capacitor C41 is also changed by a signal amount similar to being amplified by N times the Δ V2. At this time, the signal change amount when a capacitance distribution with the capacitor C42 connected to the same node occurs is a signal amount which is the product of the signal amplified by N times the Δ V2 and C41/(C41+C42), so that the signal amount can be increased to a voltage amplified by N times the signal change amount Δ V3 in the conventional circuit.

Then, at the time t4, the horizontal signal line (the node SIG14a of FIG. 3) is fixed to a constant voltage by turning on the RS pulse in the signal output unit 50.

At the time t5, by the HSEL pulse in the signal output unit 50, the signal amplified by N times the Δ V3 charged to the capacitor C42 becomes a signal amount which is the product of the signal amplified by N times the Δ V3 and C42/(C42+C51), because of the capacitance distribution with the horizontal signal line parasitic capacitor C51, and the signal amount can be increased to a voltage amplified by N times the signal change amount Δ V4 in the conventional circuit.

That is, by performing signal amplification by the circuit in the solid state image pickup device, a solid state image pickup device dramatically high in sensitivity compared with the conventional device can be provided. Moreover, by incorporating the pixel signal amplification unit 60 between the pixel unit 10 and the noise cancellation unit 40, noise components such as thermal noises and 1/f noises caused at the noise cancellation unit 40 and succeeding elements are not amplified, which leads to an improvement in S/N. Further, by performing signal amplification, the capacitance for noise cancellation can be reduced; for example, when an N-fold amplification circuit is incorporated, the capacitance for noise cancellation can be reduced to 1/N times without S/N degraded.

Figure 4:
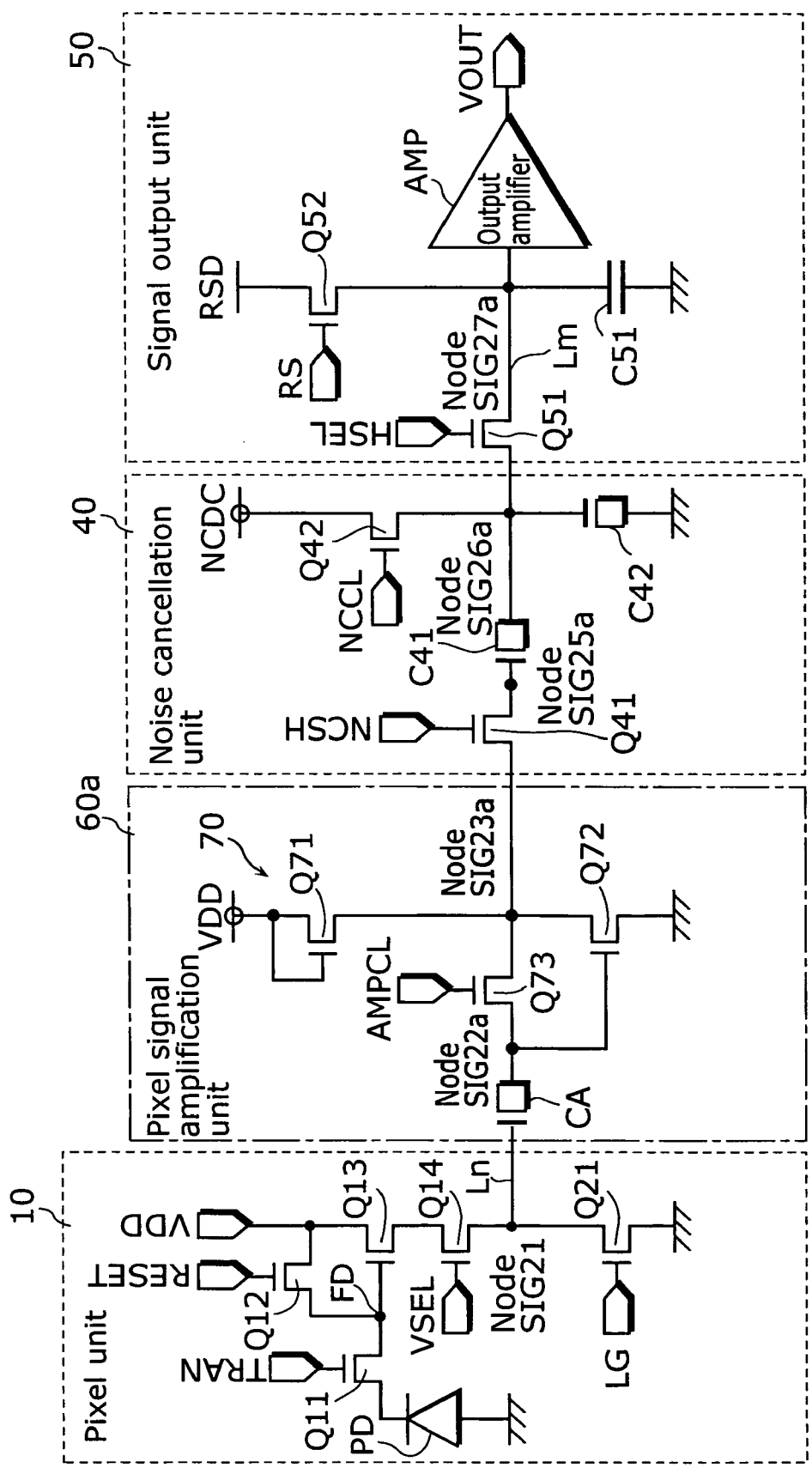
FIG. 4 A circuit diagram of the NMOS solid state image pickup device according to the first embodiment of the present invention.

FIG. 4 is a view showing an example of a concrete circuit of the column amplifier 70 according to the first embodiment of the present invention.

In a pixel signal amplification unit 60a of a solid state image pickup device 120 according to the present embodiment, a capacitor CA is disposed that clamps the source follower output signal (the node SIG21 of FIG. 4) of the pixel signal in the pixel unit 10, and an inverting amplifier is provided in the succeeding stage.

Figure 5:
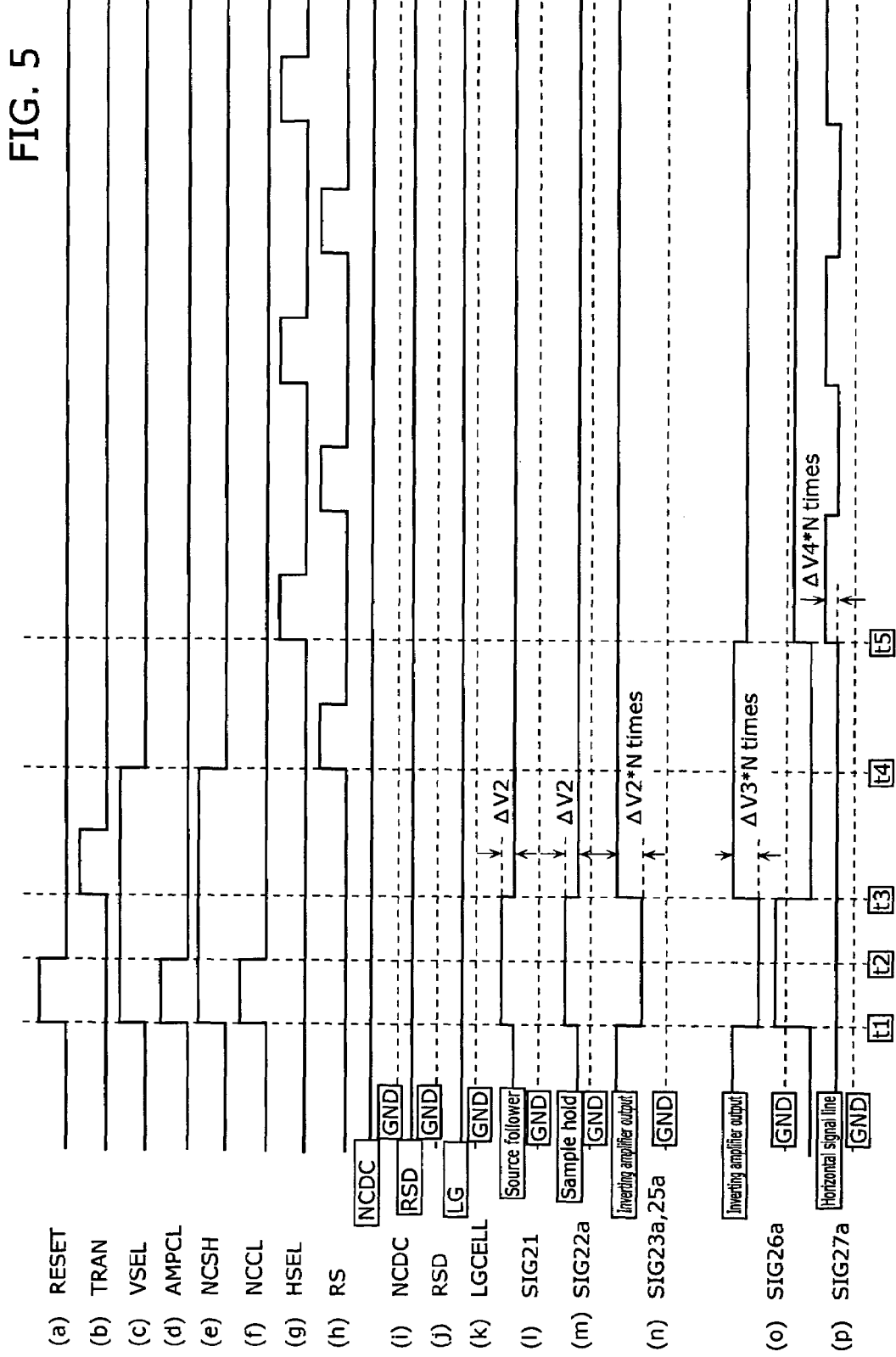
FIG. 5 A driving timing chart of the circuit of the NMOS solid state image pickup device according to the first embodiment of the present invention.

FIG. 5 is a chart showing the driving timing thereof.

At the time t1, the RESET pulse is turned on to supply VDD to the floating diffusion FD. At this time, by turning on the VSEL pulse, the signal (the node SIG21 of FIG. 4) from SF with the floating diffusion FD as the gate is inputted to the capacitor CA of the succeeding pixel signal amplification unit 60a. At this time, an AMPCL pulse in the pixel signal amplification unit 60a is turned on, and this, together with the threshold voltage of a transistor Q72 of the succeeding inverting amplifier, charges the capacitor CA. At this time, by turning on the AMPCL pulse, the voltages at the drain and gate of the transistor Q72 are made the same, and the initial state is set by the threshold voltage of the transistor Q72 and the black level signal inputted to the pixel signal amplification unit 60a. Thereby, the variation in the threshold value of the transistor Q72 among the columns can be canceled. As for the AMPCL pulse, by supplying the pulse only within the vertical blanking period, the switching noise of the circuit can be significantly reduced.

Then, by turning on the NCSH pulse in the noise cancellation unit 40, the output signal in the pixel signal amplification unit 60a is supplied to one end (the node SIG25a of FIG. 4) of the capacitor C41 of the noise cancellation unit 40. At this time, by turning on the NCCL pulse at the same time, a constant clamping voltage (hereinafter, NCDC) is supplied to the other end (the node SIG26a of FIG. 4) of the capacitor C41, whereby the capacitor C41 is charged.

At the time t2, the RESET pulse in the pixel unit 10 and the NCCL pulse in the noise cancellation unit 40 are turned off, and the TRAN pulse is turned on to transfer the charge accumulated in the photodiode PD that converts light into an electric signal, to the floating diffusion FD. By the potential of the floating diffusion FD being changed by $\Delta$ V1 from the VDD level, the signal from SF is also changed by $\Delta$ V2, and the signal (the node SIG21 of FIG. 4) where the variation among the threshold values of SFs is canceled is inputted to the succeeding pixel signal amplification unit 60a. At this time, the AMPCL pulse in the pixel signal amplification unit 60a is off. Here, $\Delta$ V2 is amplified to an N-fold signal by an N-fold amplification inverting amplifier of the pixel signal amplification unit 60a, and is supplied to one end (the node SIG25a of FIG. 4) of the capacitor C41 of the noise cancellation unit 40. Thereby, the signal (the node SIG26a of FIG. 4) at the other end of the capacitor C41 is also changed by a signal amount similar to being amplified by N times the $\Delta$ V2. At this time, the signal change amount when a capacitance distribution with the capacitor C42 connected to the same node occurs is a signal amount which is the product of the signal amplified by N times the $\Delta$ V2 and C41/(C41+C42), and the signal amount can be increased to a voltage amplified by N times the signal change amount $\Delta$ V3 in the conventional circuit.

Then, at the time t4, the horizontal signal line (the node SIG27a of FIG. 4) is fixed to a constant voltage by turning on the RS pulse in the signal output unit 50.

At the time t5, by the HSEL pulse in the signal output unit 50, the signal amplified by N times the $\Delta$ V3 charged to the capacitor C42 becomes a signal amount which is the product of the signal amplified by N times the $\Delta$ V3 and C42/(C42+C51), because of the capacitance distribution with the horizontal signal line parasitic capacitor C51, and the signal amount can be increased to a voltage amplified by N times the signal change amount $\Delta$ V4 in the conventional circuit.

As described above, by incorporating the column amplifier between the pixel unit and the noise cancellation unit, noise components such as thermal noises and 1/f noises caused at the noise cancellation unit and succeeding elements are not amplified, and the S/N ratio is improved. Moreover, by performing signal amplification by the column amplifier, the capacitance of the noise cancellation unit can be reduced to approximately 1/N times, so that the chip area can be reduced.

Second Embodiment

Figure 6:
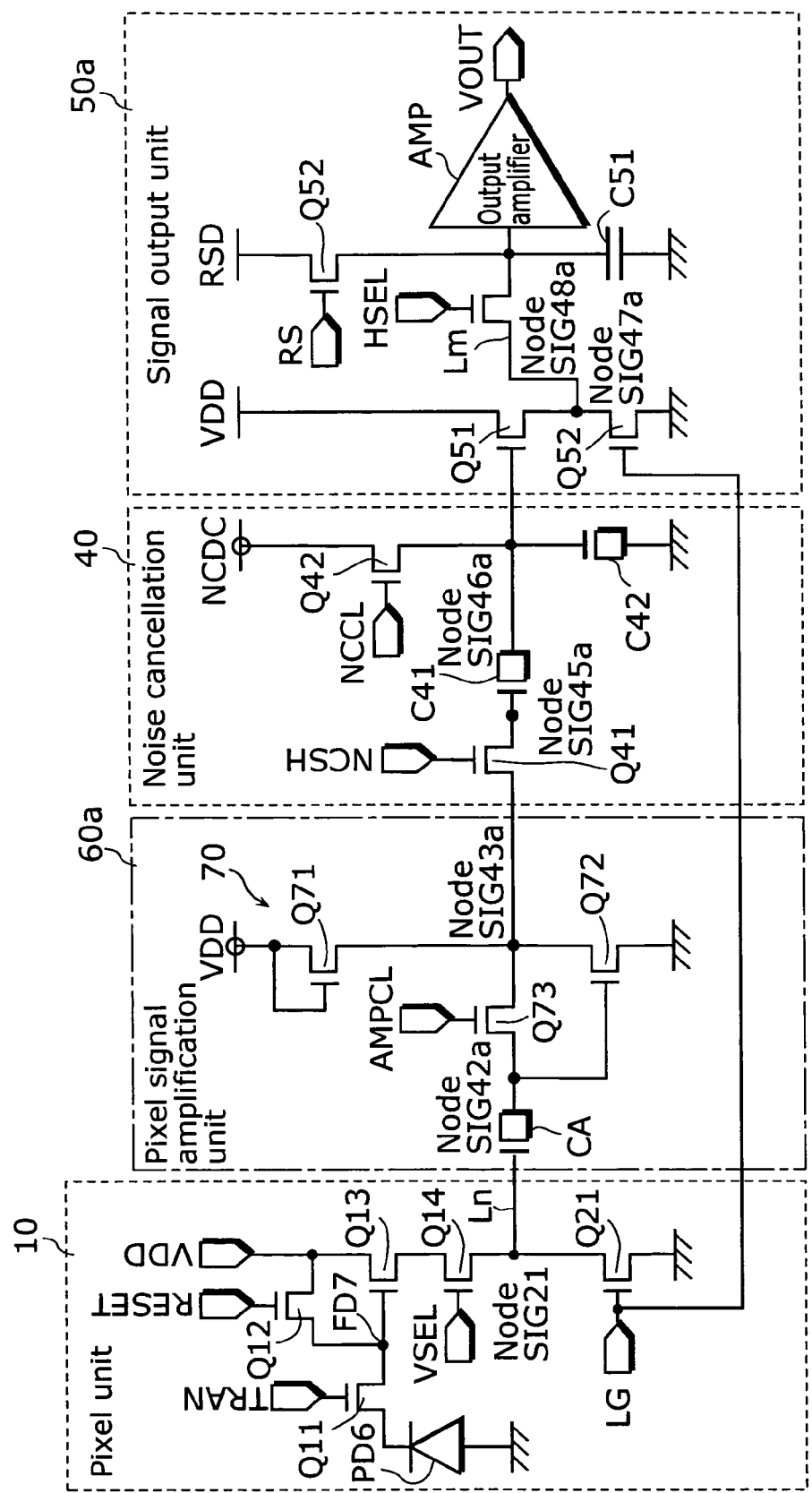
FIG. 6 A circuit diagram of an NMOS solid state image pickup device according to a second embodiment of the present invention.

FIG. 6 shows a circuit of an NMOS solid state image pickup device in which the degradation in pixel characteristic due to a heat treatment in the course of the formation of a P-type MOS according to a second embodiment of the present invention is prevented. A solid state image pickup device 130 according to the second embodiment of the present invention is different from the first embodiment in that a source follower circuit for impedance conversion is added to an input unit of a signal output unit 50a.

In the second embodiment, since the signal from the noise cancellation unit 40 is transferred to the horizontal signal line after having passed through a circuit that performs impedance conversion in the circuit of the first embodiment, the capacitance distribution due to the horizontal signal line parasitic capacitor C51 does not occur, so that higher sensitivity and lower noise than those of the circuit of the first embodiment can be realized and reduction in chip area can be easily realized.

Figure 7:
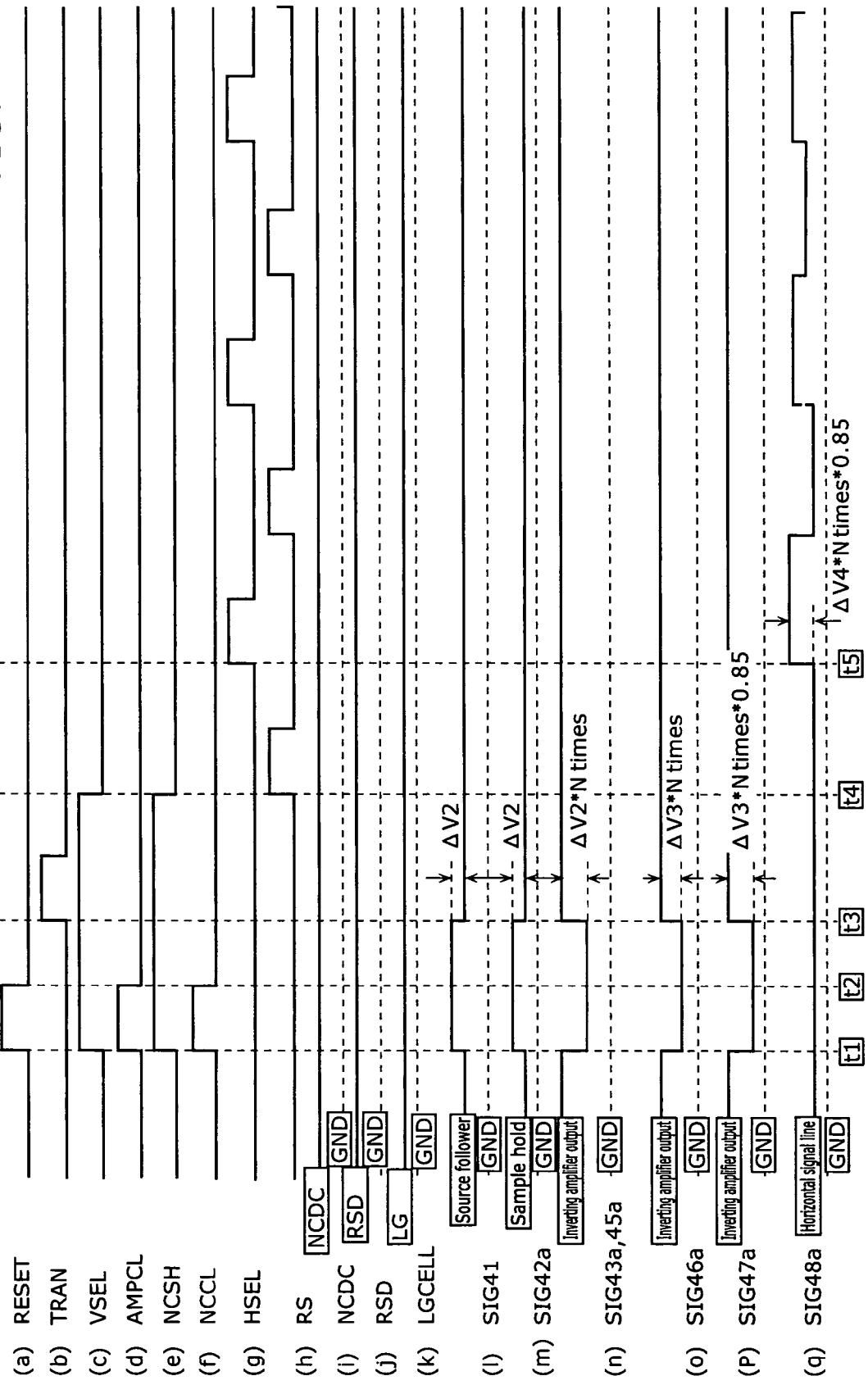
FIG. 7 A driving timing chart of the circuit of the solid state image pickup device according to the second embodiment of the present invention.

FIG. 7 is a chart showing the driving timing of the NMOS solid state image pickup device 130.

At the time to, the RESET pulse is turned on to supply VDD to the floating diffusion FD. At this time, by turning on the VSEL pulse, the signal (the node SIG41 of FIG. 6) from SF with the floating diffusion FD as the gate is inputted to the capacitor CA of the succeeding pixel signal amplification unit 60a. At this time, the AMPCL pulse in the pixel signal amplification unit 60a is turned on, and this, together with the threshold voltage of the transistor Q72 of the succeeding inverting amplifier, charges the capacitor CA. At this time, by turning on the AMPCL pulse, the voltages at the drain and gate of the transistor Q72 are made the same, and the initial state is set by the threshold voltage of the transistor Q72 and the black level signal inputted to the pixel signal amplification unit 60a. Thereby, the variation in the threshold value of the transistor Q72 among the columns can be canceled. As for the AMPCL pulse, by supplying the pulse only within the vertical blanking period, the switching noise of the circuit can be significantly reduced.

Then, by turning on the NCSH pulse, the output signal in the pixel signal amplification unit 60a is supplied to one end (the node SIG45a of FIG. 6) of the capacitor C41 of the noise cancellation unit 40. At this time, by turning on the NCCL pulse at the same time, a constant clamping voltage (hereinafter, NCDC) is supplied to the other end (the node SIG46a of FIG. 6) of the capacitor C41, whereby the capacitor C41 is charged.

At the time t2, the RESET pulse and the NCCL pulse are turned off, and the TRAN pulse is turned on to transfer the charge accumulated in the photodiode PD that converts light into an electric signal, to the floating diffusion FD. By the potential of the floating diffusion FD being changed by $\Delta$ V1 from the VDD level, the signal from SF is also changed by $\Delta$ V2, and the signal (the node SIG41 of FIG. 6) where the variation among the threshold values of SFs is canceled is inputted to the succeeding pixel signal amplification unit 60a. At this time, the AMPCL pulse in the pixel signal amplification unit 60a is off. Here, $\Delta$ V2 is amplified to an N-fold signal by an N-fold amplification inverting amplifier of the pixel signal amplification unit 60a, and is supplied to one end (the node SIG45a of FIG. 6) of the capacitor C41 of the noise cancellation unit 40. Thereby, the signal (the node SIG46a of FIG. 6) at the other end of the capacitor C41 is also changed by a signal amount similar to being amplified by N times the $\Delta$ V2. At this time, the signal change amount when a capacitance distribution with the capacitor C42 connected to the same node occurs is a signal amount which is the product of the signal amplified by N times the $\Delta$ V2 and C41/(C41+C42), and the signal amount can be increased to a voltage amplified by N times the signal change amount $\Delta$ V3 in the conventional circuit.

Then, at the time t4, the horizontal signal line (the node SIG48a of FIG. 6) is fixed to a constant voltage by turning on the RS pulse in the signal output unit 50a.

At the time t5, by the HSEL pulse in the signal output unit 50a, the signal amplified by N times the $\Delta$ V3 charged to the capacitor C42 appears on the horizontal signal line (the node SIG48a of FIG. 6) as a signal reduced to 0.8 to 0.9 times by passing through the source follower circuit for impedance conversion including the transistor Q52. However, since there is no influence of the capacitance distribution with the horizontal signal line parasitic capacitor C51 because of the addition of the source follower circuit for impedance conversion, the output signal amount can be made larger than the signal change amount $\Delta$ V4 in the conventional circuit where the signal amount is the product of the signal amplified by N times the $\Delta$ V3 and C42/(C42+C51).

As described above, by providing the circuit that prevents the capacitance distribution on the horizontal signal line, higher sensitivity and lower noise in the final output signal can be achieved.

Third Embodiment

Figure 8:
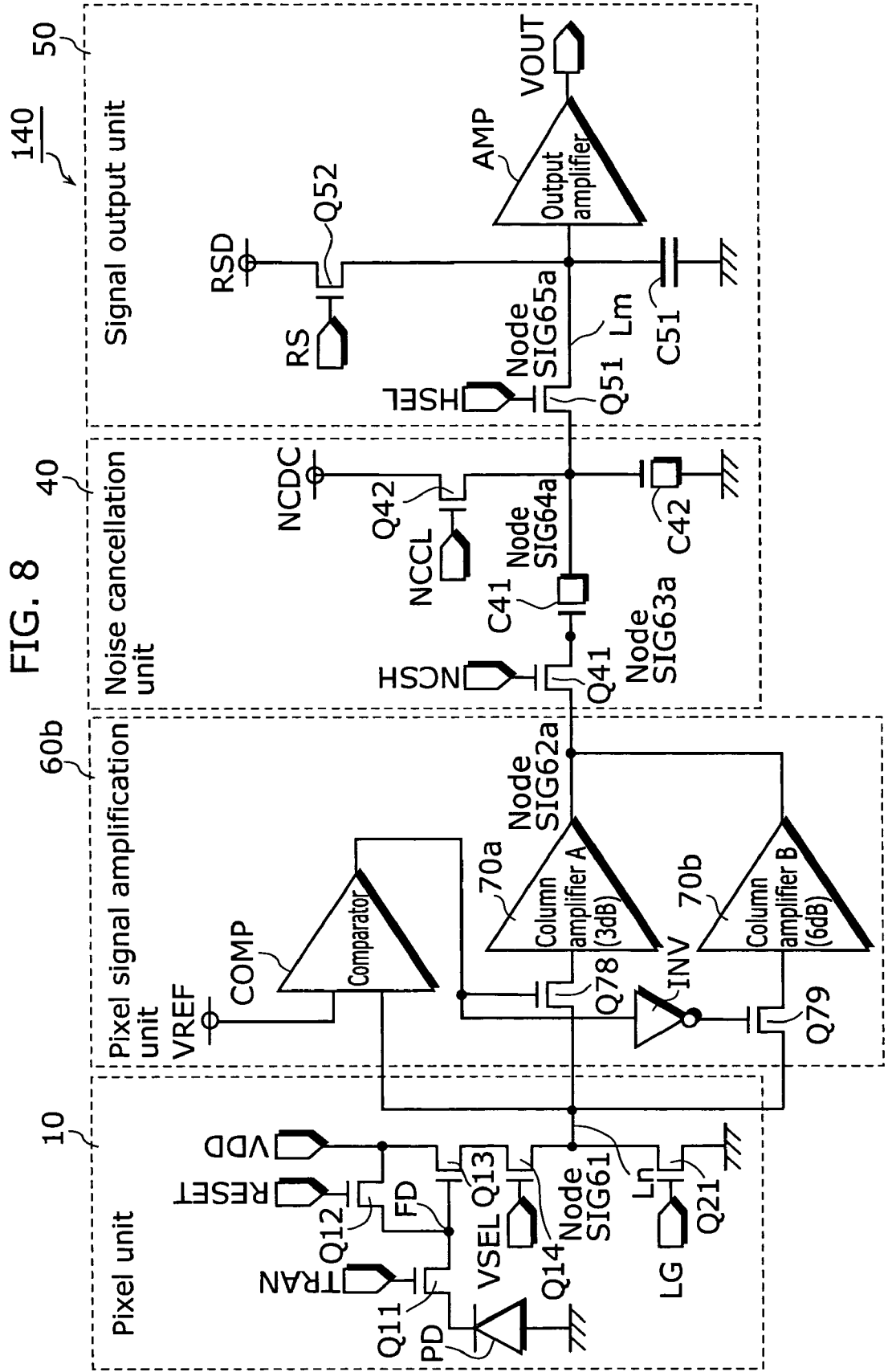
FIG. 8 A conceptual circuit diagram of an NMOS solid state image pickup device according to a third embodiment of the present invention.

FIG. 8 is a conceptual circuit diagram of an NMOS solid state image pickup device in which the degradation in pixel characteristic due to a heat treatment in the course of the formation of P-type MOS according to a third embodiment of the present invention is prevented.

A solid state image pickup device 140 is structured so that a pixel signal amplification unit 60b is capable of varying the amplification degree according to the level of the output voltage of the pixel unit 10. In this structure example, the pixel signal amplification unit 60b has column amplifiers 70a and 70b having different amplification degrees selected by a comparator COMP, and selects either one of the column amplifiers 70a and 70b according to the level of the output voltage of the pixel unit 10.

The potential of the node SIG61 in the pixel unit 10 and VREF are compared by the comparator COMP, and when the potential of the node SIG61 is higher than VREF, the voltage of the node SIG61 is controlled by the output potential of the comparator COMP so as to be inputted to the input terminal of the column amplifier 70a and not to be inputted to the input terminal of the other column amplifier 70b. Therefore, the potential of the node SIG62a which is the output terminal of the column amplifiers 70a and 70b is determined by the output potential of the column amplifier 70a of the lower amplification degree.

Conversely, when the potential of the node SIG61 is lower than VREF, the voltage of the node SIG61 is controlled by the output potential of the comparator COMP so as to be inputted to the input terminal of the column amplifier 70b and not to be inputted to the input terminal of the other column amplifier 70a. Therefore, the potential of the node SIG2 which is the output terminal of the column amplifiers 70a and 70b is determined by the output potential of the column amplifier 70b of the higher amplification degree.

As described above, the output signal can be made a more desirable one by largely amplifying it when the signal level of the pixel unit is low and amplifying it a little when the level is high.

The structure of the pixel signal amplification unit 60b is not limited to the structure described in the third embodiment; three or more column amplifiers may be included or the amplification degree may continuously vary according to the level of the output voltage of the pixel unit 10.

Fourth Embodiment

Figure 9:
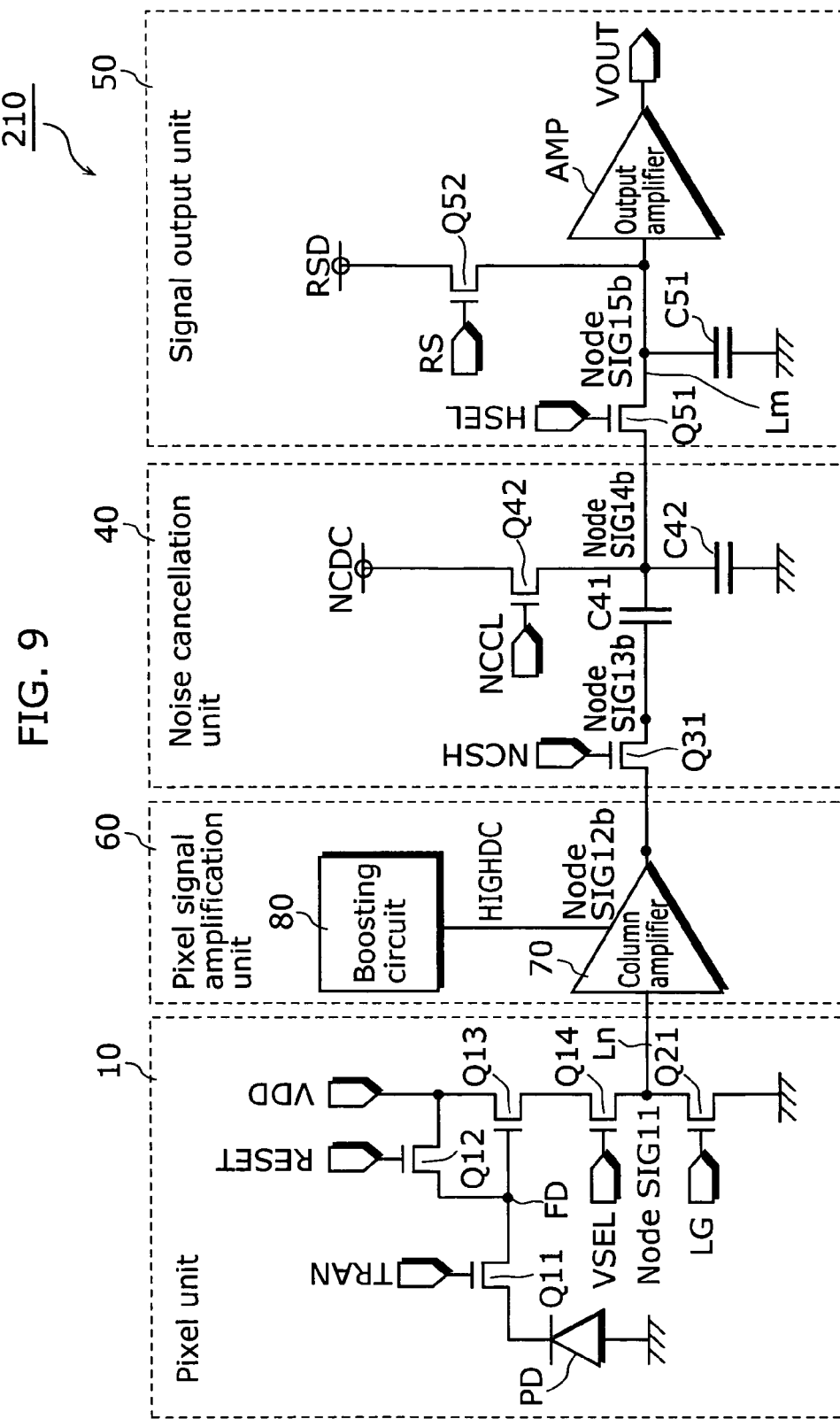
FIG. 9 A conceptual circuit diagram in which the circuit comprises only N-type MOS according to a fourth embodiment of the present invention.

FIG. 9 is a conceptual circuit diagram in which the circuit comprises only N-type MOS according to a fourth embodiment of the present invention.

A solid state image pickup device 210 has the pixel signal amplification unit 60 inserted between the pixel unit 10 and the noise cancellation unit 40 as well as the pixel unit 10, the noise cancellation unit 40 and the signal output unit 50. The pixel signal amplification unit 60 has the column amplifier 70 and a boosting circuit 80. The pixel unit 10, the noise cancellation unit 40 and the signal output unit 50 are the same as those of the above-described conventional solid state image pickup device 900, and detailed descriptions of the structures thereof are therefore omitted.

The boosting circuit 80 generates a high boosting voltage from the power supply voltage VDD.

The column amplifier 70 amplifies the voltage from the source follower SF by N times and outputs it, and further, by using the boosting voltage generated by the boosting circuit 80, the linearity is improved to increase the dynamic range.

Next, the operation of the solid state image pickup device 210 will be described.

Figure 10:
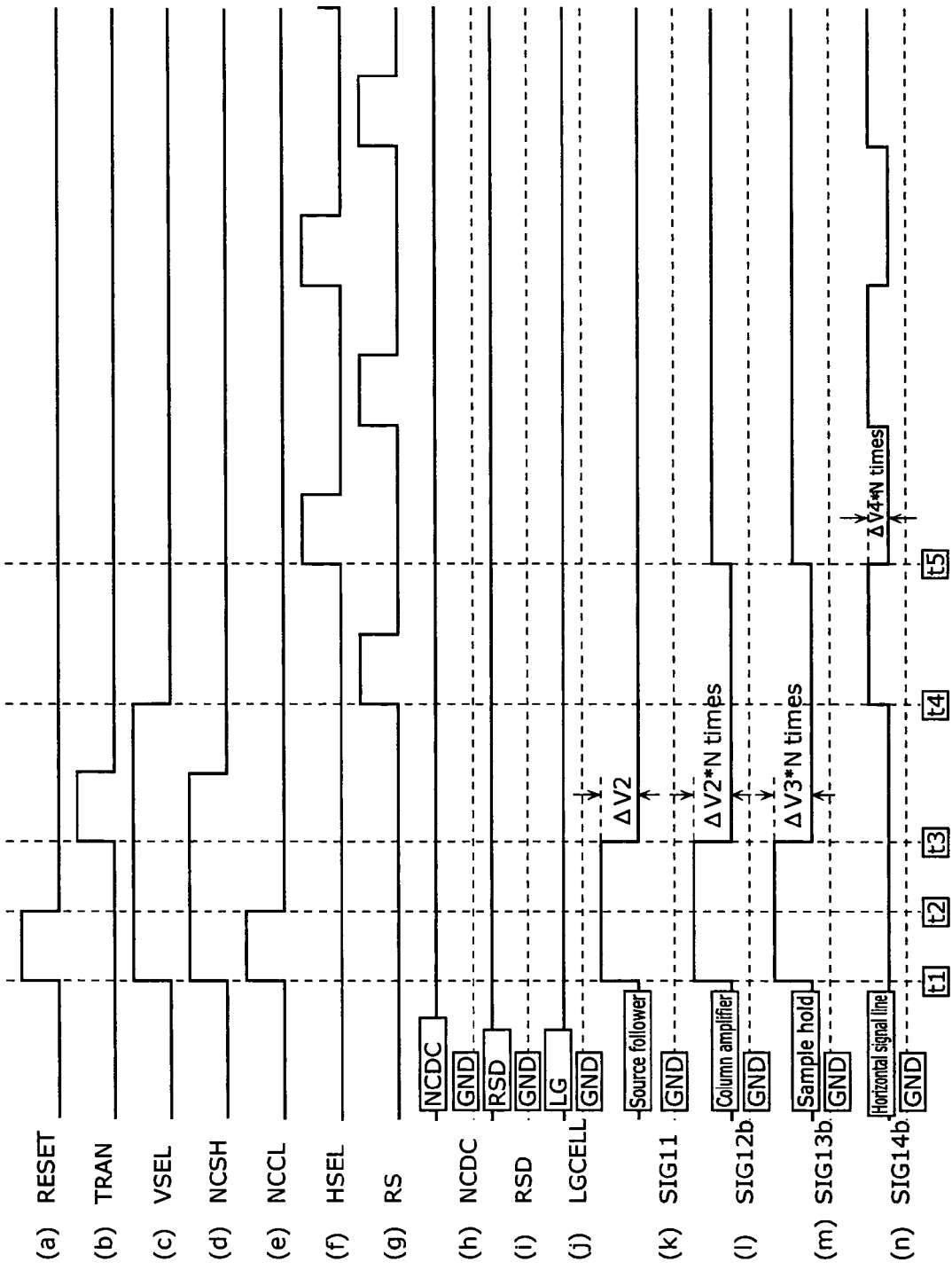
FIG. 10 A chart showing the driving timing to drive the transistors of a solid state image pickup device 210.

FIG. 10 is a chart showing the driving timing to drive the transistors of the solid state image pickup device 210.

First, at the time to, the reset transistor Q12 is turned on by the RESET pulse to supply the power supply voltage VDD to the floating diffusion FD. At this time, the row selection transistor Q14 is turned on by the VSEL pulse to input a voltage (the node SIG11 of FIG. 9) corresponding to the charge of the floating diffusion FD from the source follower SF to the succeeding column amplifier 70 and amplify the voltage by N times (the node SIG12b of FIG. 9), and further, the sample hold transistor Q31 is turned on by the NCSH pulse to supply the voltage to one end (the node SIG13b of FIG. 9) of the clamp capacitor C41 of the noise cancellation unit 40. At this time, by turning on the clamp transistor Q42 by the NCCL pulse at the same time, a constant clamping voltage NCDC is supplied to the other end (the node SIG14b of FIG. 9) of the clamp capacitor C41, whereby the clamp capacitor C41 is charged.

The boosting circuit 80 that generates the boosting voltage higher than the power supply voltage VDD is added to the column amplifier 70, and by using the boosting voltage generated by the boosting circuit 80, the linearity is improved to increase the dynamic range.

Then, at the time t2, the RESET pulse and the NCCL pulse are made low to thereby turn off the reset transistor Q12 and the clamp transistor Q42.

At the time t3, the transfer transistor Q11 is turned on by the TRAN pulse to transfer the charge accumulated in the photodiode PD that converts light into an electric signal, to the floating diffusion FD. By the potential of the floating diffusion FD being changed by $\Delta V1$ from the VDD level, the signal (the node SIG11 of FIG. 9) from the source follower SF is also changed by $\Delta V2$, and the signal where the variation among the threshold values of SFs is canceled is inputted to the succeeding column amplifier 70 to be amplified to an N-fold voltage and is supplied to one end (the node SIG13b of FIG. 9) of the capacitor C41 of the succeeding noise cancellation unit 40. Thereby, the signal (the node SIG14b of FIG. 9) at the other end of the capacitor C41 is also changed by a signal amount similar to being amplified by N times the $\Delta V2$. At this time, the signal change amount when a capacitance distribution with the clamp capacitor C41 connected to the same node occurs is a signal amount which is the product of the signal amplified by N times the $\Delta V2$ and $C41/(C41+C42)$, so that the signal amount can be increased to a voltage amplified by N times the signal change amount $\Delta V3$ in the conventional circuit.

Then, at the time t4, the horizontal signal line Lm (the node SIG14b of FIG. 9) is fixed to a constant voltage by turning on the horizontal line initialization transistor Q52 of the signal output unit 50 by the RS pulse.

At the time t5, by turning on the column selection transistor Q51 of the signal output unit 50 by the HSEL pulse, the signal amplified by N times the $\Delta V3$ charged to the sample hold capacitor C42 becomes a signal amount which is the product of the signal amplified by N times the $\Delta V3$ and $C42/(C42+C51)$, because of the capacitance distribution with the horizontal signal line parasitic capacitor C51, and the signal amount can be increased to a voltage amplified by N times the signal change amount ΔV4 in the conventional circuit.

That is, by performing signal amplification by the column amplifier 70 in the solid state image pickup device 210, a solid state image pickup device dramatically high in sensitivity compared with the conventional device can be provided. Moreover, by incorporating the pixel signal amplification unit 60 between the pixel unit 10 and the noise cancellation unit 40, noise components such as thermal noises and 1/f noises caused at the noise cancellation unit 40 and succeeding elements are not amplified, which leads to an improvement in S/N. Further, by performing signal amplification, the capacitance for noise cancellation can be reduced; for example, when an N-fold amplification circuit is incorporated, the capacitance for noise cancellation can be reduced to 1/N times without S/N degraded. In addition, by applying a boosting voltage, higher than the power supply voltage VDD, generated by the boosting circuit 80 to the column amplifier 70, the linearity is improved to increase the dynamic range.

Fifth Embodiment

Figure 11:
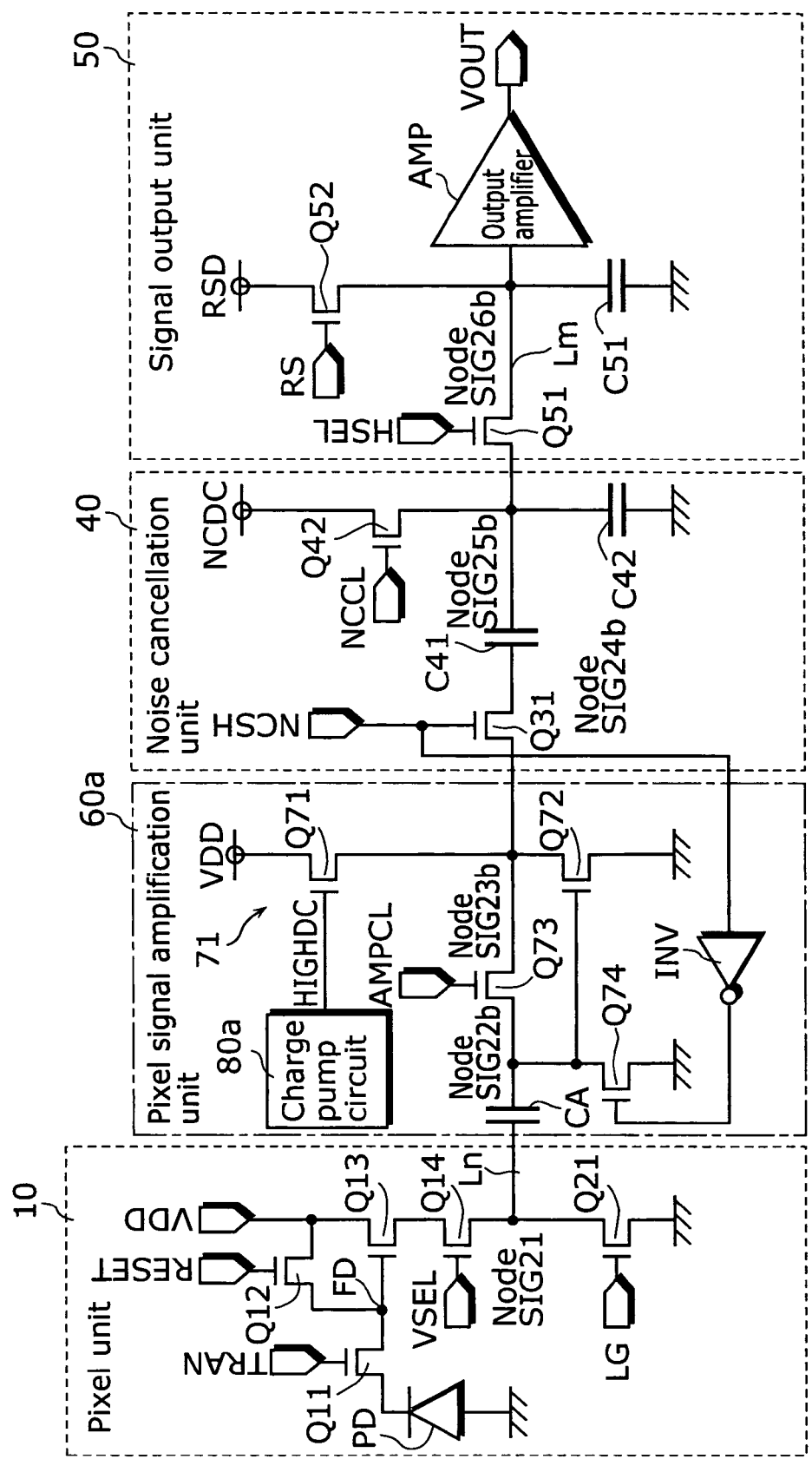
FIG. 11 A view showing a circuit example which is an implementation of the solid state image pickup device according to the fourth embodiment of the present invention.

FIG. 11 is a view showing a circuit example which is an implementation of the solid state image pickup device according to the fourth embodiment of the present invention.

The pixel signal amplification unit 60a of the solid state image pickup device 220 according to a fifth embodiment includes the capacitor CA, the load transistor Q71, the drive transistor Q72, an inverting amplification column amplifier 71, an amplifier reset transistor Q73, a switching transistor Q74 and an inverting circuit INV.

The load transistor Q71 and the drive transistor Q72 constitute the inverting amplification column amplifier 71.

The capacitor CA clamps the signal (the node SIG21 of FIG. 10) outputted from the source follower SF in the pixel unit 10.

The inverting amplification column amplifier 71 is constituted by the load transistor Q71 and the drive transistor Q72 disposed between the power source VDD and GND, and inversely amplifies the signal inputted from the source follower SF by N times by the characteristics of the load transistor Q71 and the drive transistor Q72.

The amplifier reset transistor Q73 is for switching the gate of the drive transistor Q72 of the inverting amplification column amplifier 71 and the input and output of the inverting amplification column amplifier 71, that is, for making the voltages at the gate and drain of the drive transistor Q72 the same, and the initial state is set by the threshold voltage of the drive transistor Q72 and the black level signal inputted from the source follower SF.

The switching transistor Q74 and the inverting circuit INV interrupt the drive current of the drive transistor Q72 by grounding the gate of the drive transistor Q72 except during the necessary operation period, thereby reducing the current consumption by the inverting amplification column amplifier 71.

For the inverting amplification column amplifier 71, a boosting voltage HIGHDC higher than the power supply voltage VDD is applied to the gate of the load transistor Q71 thereof so that the ON resistance value of the load transistor Q71 is substantially 0, thereby preventing the voltage drop phenomenon due to the threshold value of the load transistor Q71.

By this method, the linearity of the inverting amplification column amplifier 71 is improved, so that the dynamic range can be increased. The gain adjustment and the linearity of the inverting amplification column amplifier 71 are arbitrarily set by the drive side and the size of the load transistor Q71.

As a concrete example of the boosting circuit 80, a charge pump circuit 80a that operates by the charge pump method is considered.

Figure 12:
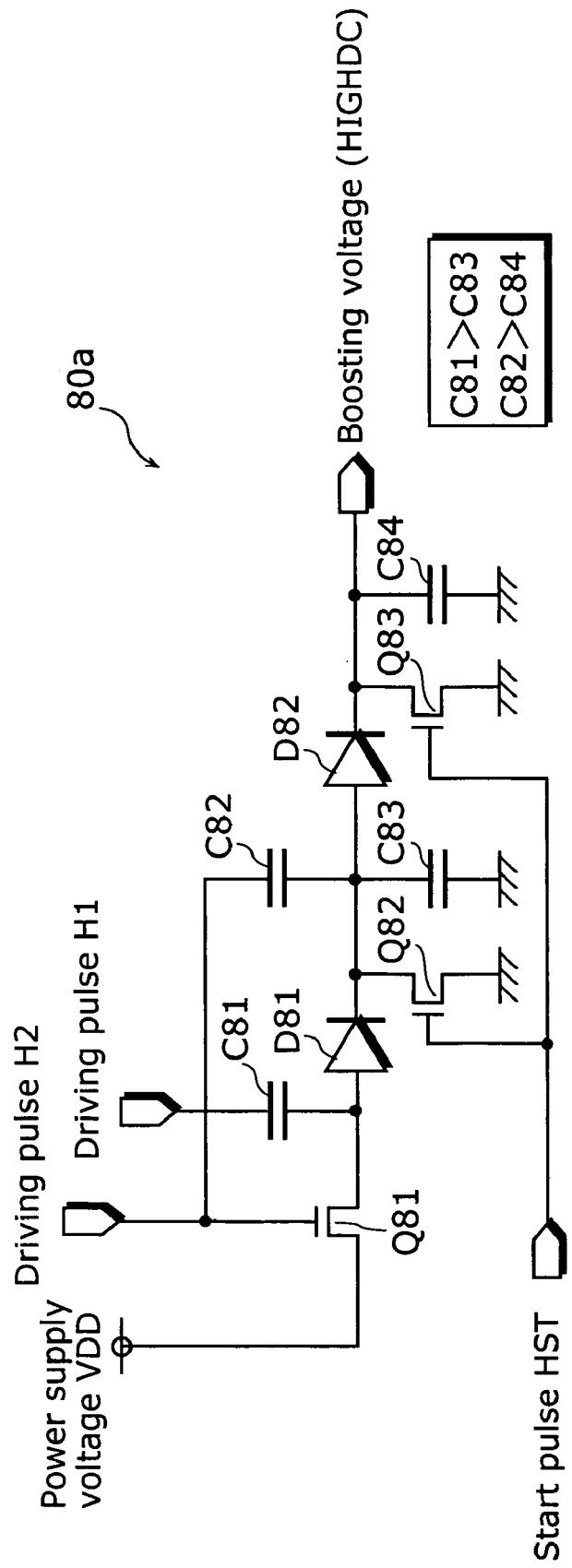
FIG. 12 A view showing a concrete circuit example of the charge pump circuit 80*a*.

FIG. 12 is a view showing a concrete circuit example of the charge pump circuit 80a.

As shown in FIG. 12, the charge pump circuit 80a includes capacitors C81 and C82 for charging up, capacitors C83 and C84 for rectification, diodes D81 and D82 for rectification, a transistor Q81 that charges the power supply voltage VDD to the capacitor C81, and transistors Q82 and Q83 for discharging the charge charged to the capacitors C83 and C94, and uses high-speed drive pulses H1 and H2 used for horizontal scanning circuits used in general MOS solid state image pickup devices.

The capacitor C82 is provided between the driving pulse H1, and the transistor Q81 having its drain connected to the power source, its gate connected to the driving pulse H2 and its source connected to the driving pulse H1 through the capacitor C81, the diode D81 with the source as its anode, and the cathode of the diode D81, and the capacitor C83 is provided between GND, and the transistor Q81, the diode D81 and the cathode of the diode D81.

Further, the anode of the other diode D82 is also connected, and the capacitor C84 is provided between GND and the cathode of the other diode D82. The voltage rectified by the capacitor C84 is the boosting voltage.

Further, to the cathodes of the diodes D81 and D82, the transistors Q81 and Q82 where the start pulse for driving the horizontal scanning circuit is connected to their gates and GND is connected to their sources are connected, respectively, and after the initialization to GND by the start pulse, the charge pump operation is started and the driving pulses H1 and H2 are inputted at the time of horizontal scanning, thereby generating a boosting voltage that is stable as DC.

Figure 13:
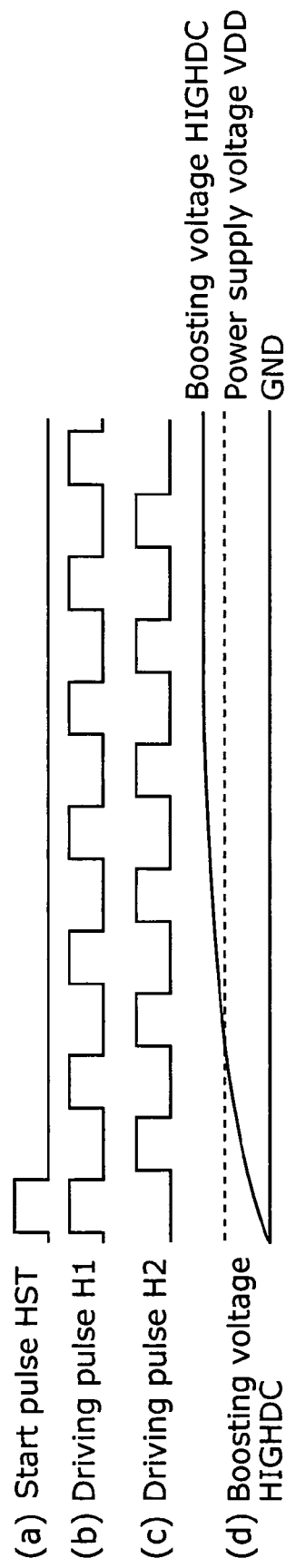
FIG. 13 A chart showing the driving timing of the charge pump circuit 80*a*.

FIG. 13 is a chart showing the driving timing of the charge pump circuit 80a.

First, the charge charged to the capacitors C83 and C84 is discharged by the start pulse HST. Then, by turning on the transistor Q81 by the driving pulse H2, the power supply voltage VDD is charged to the capacitor C82 and the potentials of the capacitors C81 and C82 are boosted by the driving pulses H1 and H2, thereby generating a boosting voltage higher than the power supply voltage VDD in a short time.

As the diodes D81 and D82, MOS transistor diodes where the gate and the drain are connected to be used as the anode and the source is used as the cathode may be used.

Next, the operation of the solid state image pickup device 220 will be described.

Figure 14:
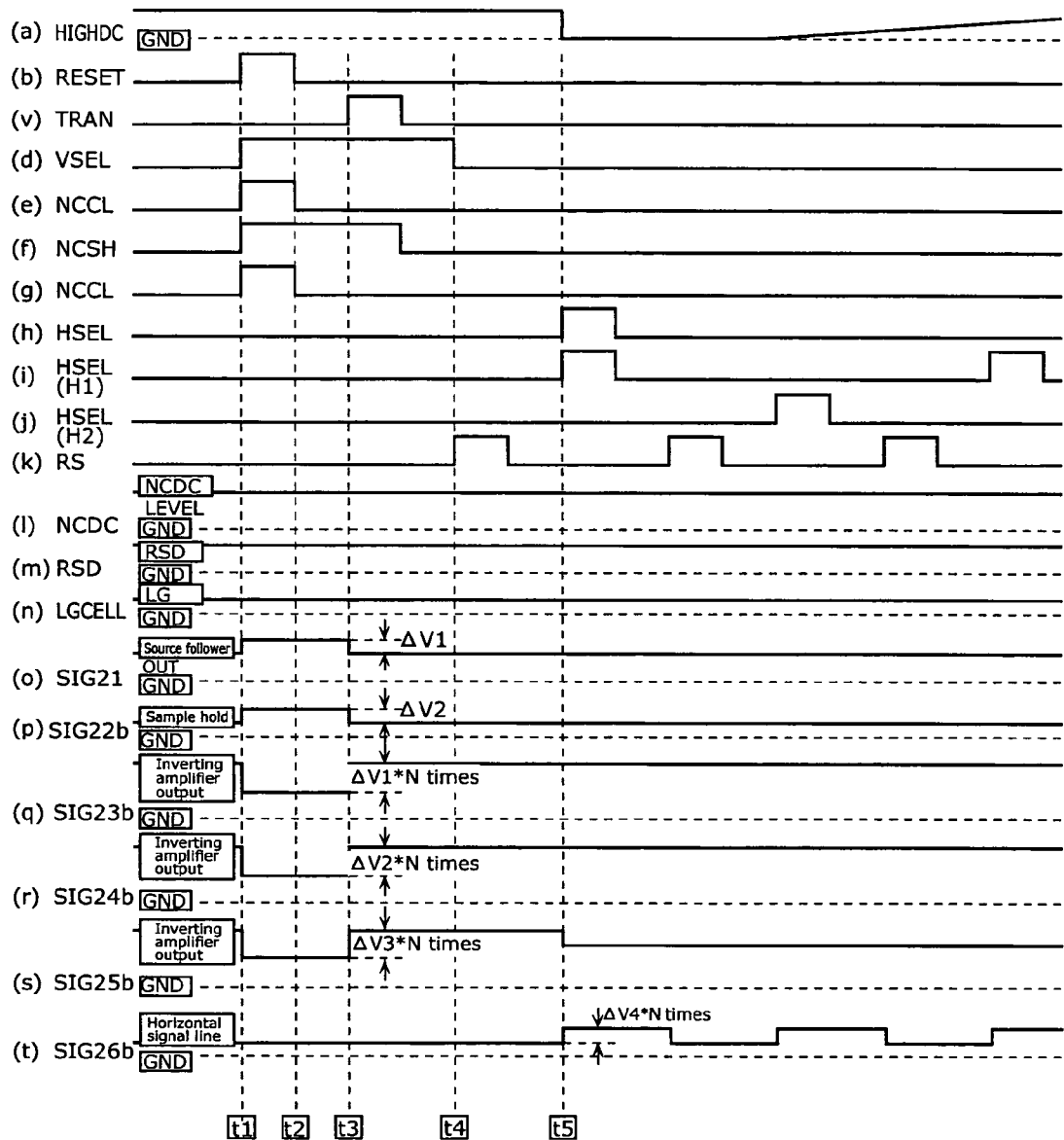
FIG. 14 A chart showing the driving timing to drive the transistors of a solid state image pickup device 220.

FIG. 14 is a chart showing the driving timing to drive the transistors of the solid state image pickup device 220.

First, at the time t0, the reset transistor Q12 is turned on by the RESET pulse to supply VDD to the floating diffusion FD. At this time, the row selection transistor Q14 is turned on by the VSEL pulse to input a signal (the node SIG21 of FIG. 10) from the source follower SF corresponding to the charge of the floating diffusion FD to the capacitor CA of the succeeding pixel signal amplification unit 60a. At this time, the amplifier reset transistor Q73 of the pixel signal amplification unit 60a is turned on by the AMPCL pulse, and this, together with the threshold voltage of the drive transistor Q72 of the succeeding inverting amplification column amplifier 71, charges the capacitor CA. At this time, by turning on the amplifier reset transistor Q73 by the AMPCL pulse, the voltages at the drain and gate of the transistor Q72 are made the same, and the initial state is set by the threshold voltage of the drive transistor Q72 and the black level signal inputted to the pixel signal amplification unit 60a.

Thereby, the variation in the threshold value of the transistor Q72 among the columns can be canceled. As for the AMPCL pulse, by supplying the pulse only within the vertical blanking period, the switching noise of the circuit can be significantly reduced.

Then, by turning on the sample hold transistor Q31 of the noise cancellation unit 40 by the NCSH pulse, the output signal of the pixel signal amplification unit 60a is supplied to one end (the node SIG24b of FIG. 10) of the sample hold capacitor C42. At this time, by turning on the clamp transistor Q42 by the NCCL pulse at the same time, a constant clamping voltage NCDC is supplied to the other end (the node SIG25b of FIG. 10) of the sample hold capacitor C42, whereby the sample hold capacitor C42 is charged.

At the time t2, the RESET pulse and the NCCL pulse are made low to thereby turn off the reset transistor Q12 of the pixel unit 10 and the clamp transistor Q42 of the noise cancellation unit 40, and the transfer transistor Q11 is turned on by the TRAN pulse to transfer the charge accumulated in PD that converts light into an electric signal, to the floating diffusion FD. By the potential of the floating diffusion FD being changed by $\Delta V1$ from the VDD level, the signal from the source follower SF is also changed by $\Delta V2$, and the signal (the node SIG21 of FIG. 10) where the variation among the threshold values of the source followers SF is canceled is inputted to the succeeding pixel signal amplification unit 60a. At this time, the amplifier reset transistor Q73 of the pixel signal amplification unit 60a is off by the AMPCL pulse being low. Here, $\Delta V2$ is amplified to an N-fold signal by the inverting amplification column amplifier 71 of the pixel signal amplification unit 60a, and is supplied to one end (the node SIG24b of FIG. 10) of the sample hold capacitor C42 of the noise cancellation unit 40. Thereby, the signal (the node SIG25b of FIG. 10) at the other end of the sample hold capacitor C42 is also changed by a signal amount similar to being amplified by N times the $\Delta V2$. At this time, the signal change amount when a capacitance distribution with the clamp capacitor C41 connected to the same node occurs is a signal amount which is the product of the signal amplified by N times the $\Delta V2$ and $C41/(C41+C42)$, and the signal amount can be increased to a voltage amplified by N times the signal change amount $\Delta V3$ in the conventional circuit.

Then, at the time t4, by turning on the horizontal line initialization transistor Q52 of the signal output unit 50 by the RS pulse, the horizontal signal line Lm (the node SIG26b of FIG. 10) is fixed at a constant voltage.

At the time t5, by turning on the column selection transistor Q51 of the signal output unit 50 by the HSEL pulse, the signal amplified by N times the $\Delta V3$ charged to the clamp capacitor C41 becomes a signal amount which is the product of the signal amplified by N times the $\Delta V3$ and $C42/(C42+C51)$, because of the capacitance distribution with the horizontal signal line parasitic capacitor C51, and the signal amount can be increased to a voltage amplified by N times the signal change amount $\Delta V4$ in the conventional circuit.

As described above, by incorporating the inverting amplification column amplifier 71 between the pixel unit 10 and the noise cancellation unit 40, noise components such as thermal noises and 1/f noises caused at the noise cancellation unit and succeeding elements are not amplified, and the S/N ratio is improved. Further, by performing signal amplification by N times by the inverting amplification column amplifier 71, the capacitance of the noise cancellation unit 40 can be made equivalent to being reduced to approximately 1/N times, so that the chip area can be reduced.

Sixth Embodiment

Figure 15:
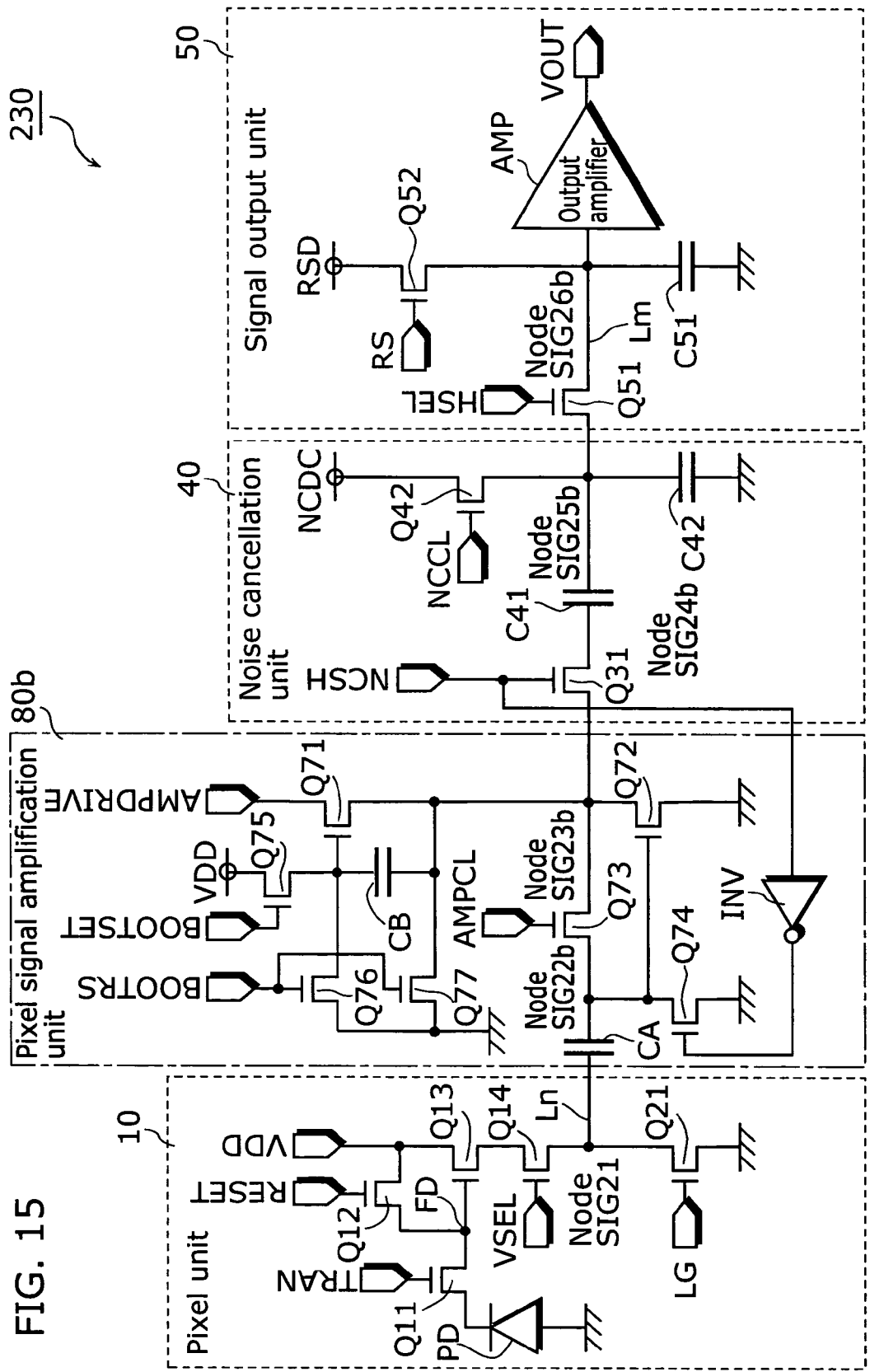
FIG. 15 A view showing a circuit example of another solid state image pickup device which is an implementation of the solid state image pickup device 210 according to the fourth embodiment of the present invention.

FIG. 15 is a view showing a circuit example of another solid state image pickup device which is an implementation of the solid state image pickup device 210 according to the fourth embodiment of the present invention.

A pixel signal amplification unit 60b of the solid state image pickup device 230 according to the sixth embodiment is provided with a bootstrap capacitor CB for booting the load transistor Q71 formed as a boosting circuit provided in each pixel signal amplification unit, and switching transistors Q75, Q76 and Q77 as well as the capacitor CA, the load transistor Q71, the drive transistor Q72, the inverting amplification column amplifier 71, the amplifier reset transistor Q73 and the switching transistor Q74.

The capacitor CA that clamps the source follower output signal (the node SIG21 of FIG. 15) of the pixel signal in the pixel unit 10 is disposed, and to the output terminal of the capacitor CA, the following are connected: the amplifier reset transistor Q73 that switches the gate of the drive transistor Q72 of the inverting amplification column amplifier 71 having the load transistor Q71 and the drive transistor Q72 between the power source and GND and the input and output of the inverting amplification column amplifier 71; and the switching transistor Q74 that grounds the gate of the drive transistor Q72 of the inverting amplification column amplifier 71 to GND.

Further, the bootstrap capacitor CB is connected to the gate and source of the load transistor Q71 of the inverting amplification column amplifier 71, the switching transistor Q75 for connection to the power supply voltage VDD is further provided at the gate of the load transistor Q71, and the switching transistors Q76 and Q77 for grounding to GND are provided at both ends of the bootstrap capacitor CB.

For the inverting amplification column amplifier 71, by connecting the bootstrap capacitor CB between the gate and source of the load transistor Q71 thereof, a boosting voltage is applied to the gate and the voltage drop phenomenon due to the threshold value of the load transistor Q71 is prevented to thereby improve the linearity of the inverting amplification column amplifier 71 and increase the dynamic range.

That is, by turning on the switching transistors Q76 and Q76 by the BOOTRS pulse, the charge of the bootstrap capacitor CB is discharged, by turning on the switching transistor Q75 by the BOOTSET pulse, the power supply voltage VDD is charged to the bootstrap capacitor CB, and by applying an AMPDRIVE pulse which is a pulsed power supply voltage VDD, to the drain of the load transistor Q71, the gate potential of the load transistor Q71 is booted.

This method is different from the circuit of FIG. 10 in that the voltage difference between the gate and source of the load transistor Q71 is always maintained constant by the bootstrap capacitor CB. This method has a characteristic that even if there is variation in the threshold value of the load transistor Q71 between adjoining columns, since the voltage difference between the gate and source of the load transistor Q71 is constant, the difference does not readily appear in the input and output gain characteristic of the inverting amplification column amplifier 71. This characteristic has the effect of deleting the variation in the longitudinal sensitivity of the output image.

Figure 16:
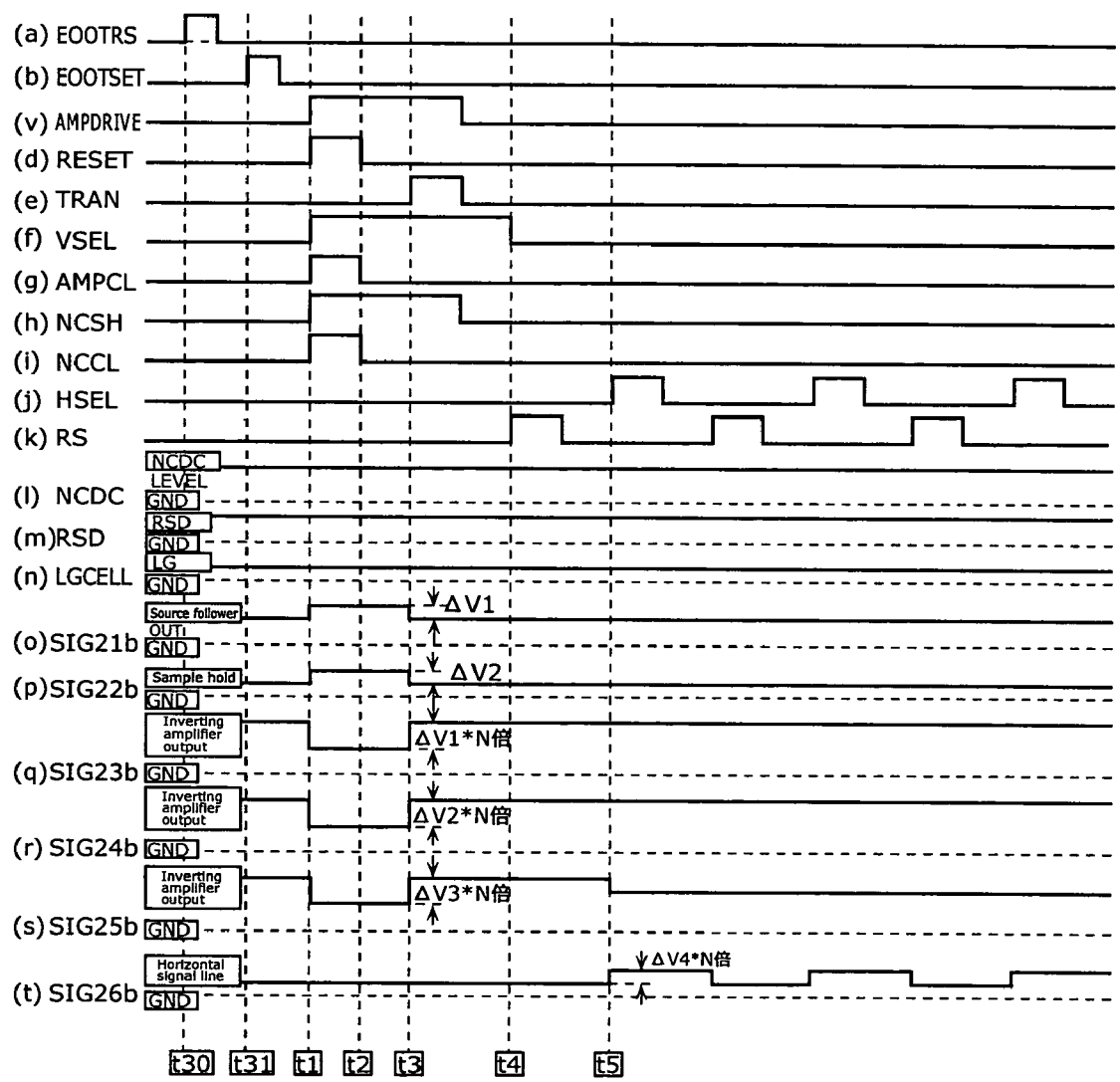
FIG. 16 A chart showing the driving timing to drive the transistors of the solid state image pickup device 230.

FIG. 16 is a chart showing the driving timing to drive the transistors of the solid state image pickup device 230.

First, at a time t00, the switching transistors Q76 and Q77 are turned on by the BOOTRS pulse to reset the potentials at both ends of the bootstrap capacitor CB to the GND level. At a time t01, the switching transistor Q75 is turned on by the BOOTSET pulse to supply a voltage of approximately the power supply voltage VDD to the connection node between the bootstrap capacitor CB and the gate of the load transistor Q71. Then, at the time to, the AMPDRIVE pulse which is a pulsed power source VDD is applied to the source of the load transistor Q71 to supply a voltage of approximately the power supply voltage VDD to the connection node between the bootstrap capacitor CB and the source of the load transistor Q71. Thereby, a boosting voltage higher than the power supply voltage VDD occurs at the connection node between the bootstrap capacitor CB and the gate of the load transistor Q71, so that the linearity of the inverting amplification column amplifier 71 can be improved and the dynamic range can be set to be high.

At the time to, the reset transistor Q12 is turned on by the RESET pulse to supply the power supply voltage VDD to the floating diffusion FD. At this time, the row selection transistor Q14 is turned on by the VSEL pulse to input a signal (the node SIG21 of FIG. 21) from the source follower SF with the floating diffusion FD as the gate to the capacitor CA of the succeeding pixel signal amplification unit 60b. At this time, the amplifier reset transistor Q73 of the pixel signal amplification unit 60b is turned on by the AMPCL pulse, and this, together with the threshold voltage of the drive transistor Q72 of the succeeding inverting amplification column amplifier 71, charges the capacitor CA. At this time, by turning on the amplifier reset transistor Q73 by the AMPCL pulse, the voltages at the drain and gate of the drive transistor Q72 are made the same, and the initial state is set by the threshold voltage of the drive transistor Q72 and the black level signal inputted to the pixel signal amplification unit 60b.

Thereby, the variation in the threshold value of the transistor Q72 among the columns can be canceled. As for the AMPCL pulse, by supplying the pulse only within the vertical blanking period, the switching noise of the circuit can be significantly reduced.

Then, by turning on the sample hold transistor Q31 of the noise cancellation unit 40 by the NCSH pulse, the output signal from the pixel signal amplification unit 60b is supplied to one end (the node SIG24b of FIG. 15) of the sample hold capacitor C42 of the noise cancellation unit 40. At this time, by turning on the clamp transistor Q42 by the NCCL pulse at the same time, a constant clamping voltage NCDC is supplied to the other end (the node SIG25b of FIG. 15) of the sample hold capacitor C42, whereby the sample hold capacitor C42 is charged.

At the time t2, the RESET pulse and the NCCL pulse are made low to thereby turn off the reset transistor Q12 of the pixel unit 10 and the clamp transistor Q42 of the noise cancellation unit 40, and the transfer transistor Q11 is turned on by the TRAN pulse to transfer the charge accumulated in PD that converts light into an electric signal, to the floating diffusion FD. By the potential of the floating diffusion FD being changed by Δ V1 from the VDD level, the signal from the source follower SF is also changed by Δ V2, and the signal (the node SIG21 of FIG. 15) where the variation among the threshold values of the source followers SF is canceled is inputted to the succeeding pixel signal amplification unit 60b. At this time, the amplifier reset transistor Q73 is off by the AMPCL pulse in the pixel signal amplification unit 60b being low. Here, Δ V2 is amplified to an N-fold signal by the N-fold inverting amplification column amplifier 71 of the pixel signal amplification unit 60b, and is supplied to one end (the node SIG24b of FIG. 15) of the sample hold capacitor C42 of the noise cancellation unit 40. Thereby, the signal (the node SIG25b of FIG. 10) at the other end of the sample hold capacitor C42 is also changed by a signal amount similar to being amplified by N times the Δ V2. At this time, the signal change amount when a capacitance distribution with the clamp capacitor C41 connected to the same node occurs is a signal amount which is the product of the signal amplified by N times the Δ V2 and C41/(C41+C42), and the signal amount can be increased to a voltage amplified by N times the signal change amount Δ V3 in the conventional circuit.

Then, at the time t4, by turning on the horizontal line initialization transistor Q52 by the RS pulse of the signal output unit 50, the horizontal signal line Lm (the node SIG26b of FIG. 10) is fixed at a constant voltage.

At the time t5, by turning on the column selection transistor Q51 of the signal output unit 50 by the HSEL pulse, the signal amplified by N times the Δ V3 charged to the clamp capacitor C41 becomes a signal amount which is the product of the signal amplified by N times the Δ V3 and C42/(C42+C51), because of the capacitance distribution with the horizontal signal line parasitic capacitor C51, and the signal amount can be increased to a voltage amplified by N times the signal change amount Δ V4 in the conventional circuit.

As described above, by incorporating the column amplifier between the pixel unit and the noise cancellation unit, noise components such as thermal noises and 1/f noises caused at the noise cancellation unit and succeeding elements are not amplified, and the S/N ratio is improved. Moreover, by performing signal amplification by N times by the column amplifier, the capacitance of the noise cancellation unit can be reduced to approximately 1/N times, so that the chip area can be reduced.

Seventh Embodiment

Figure 17:
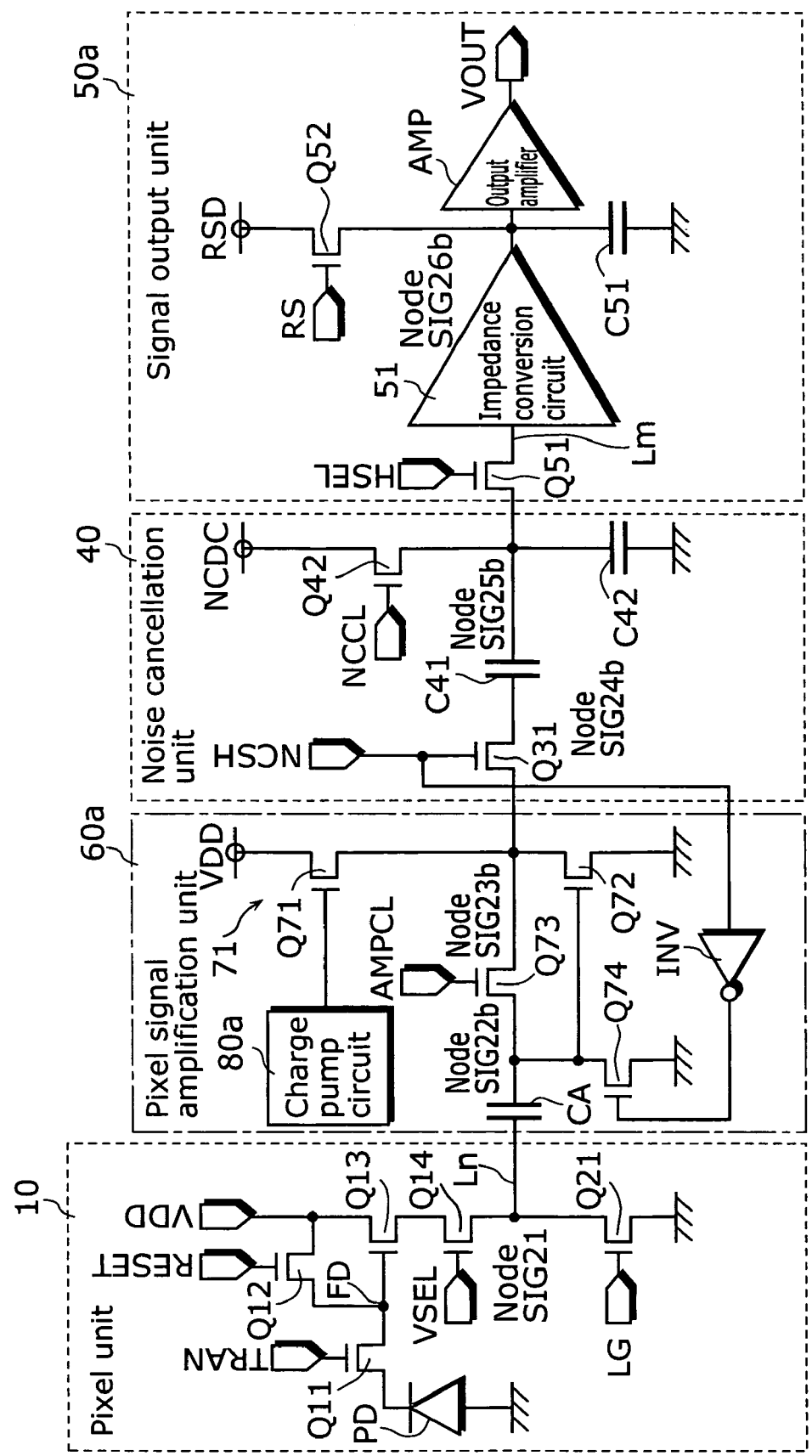
FIG. 17 A view showing a conceptual circuit diagram of an NMOS solid state image pickup device according to a seventh embodiment of the present invention.

FIG. 17 is a view showing a conceptual circuit diagram of an NMOS solid state image pickup device according to a seventh embodiment of the present invention.

A solid state image pickup device 240 according to the seventh embodiment of the present invention is different from the solid state image pickup devices 210, 220 and 230 of the fourth to third embodiments in that an impedance conversion circuit 51 is added to an input unit of the signal output unit 50a.

According to the solid state image pickup device 240 of the seventh embodiment, since the signal from the noise cancellation unit 40 is transferred to the horizontal signal line Lm through the impedance conversion circuit 51 that impedance-converts the signal first of all, the capacitance distribution due to the horizontal signal line parasitic capacitor C51 does not occur, so that higher sensitivity and lower noise than the above-described solid state image pickup devices 210, 220 and 230 can be realized and reduction in chip area can be easily realized.

Eighth Embodiment

Figure 18:
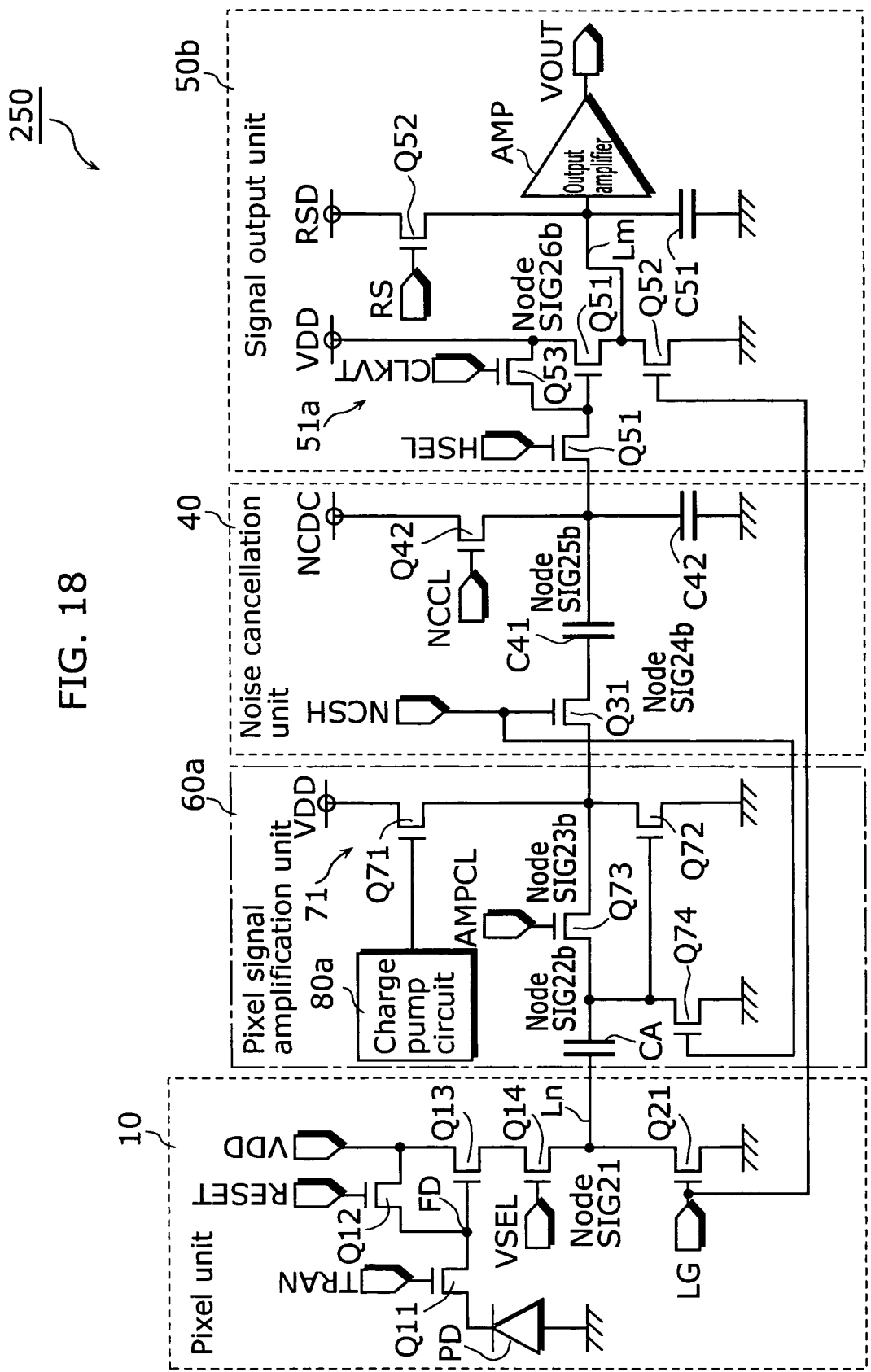
FIG. 18 A view showing a concrete circuit of a solid state image pickup device according to an eighth embodiment of the present invention.

FIG. 18 is a view showing a concrete circuit of a solid state image pickup device according to an eighth embodiment of the present invention.

A solid state image pickup device 250 shown in FIG. 18 is an example using a source follower 51a as the impedance conversion circuit 51.

The source follower 51a includes three NMOS transistors Q51, Q52 and Q53.

Figure 19:
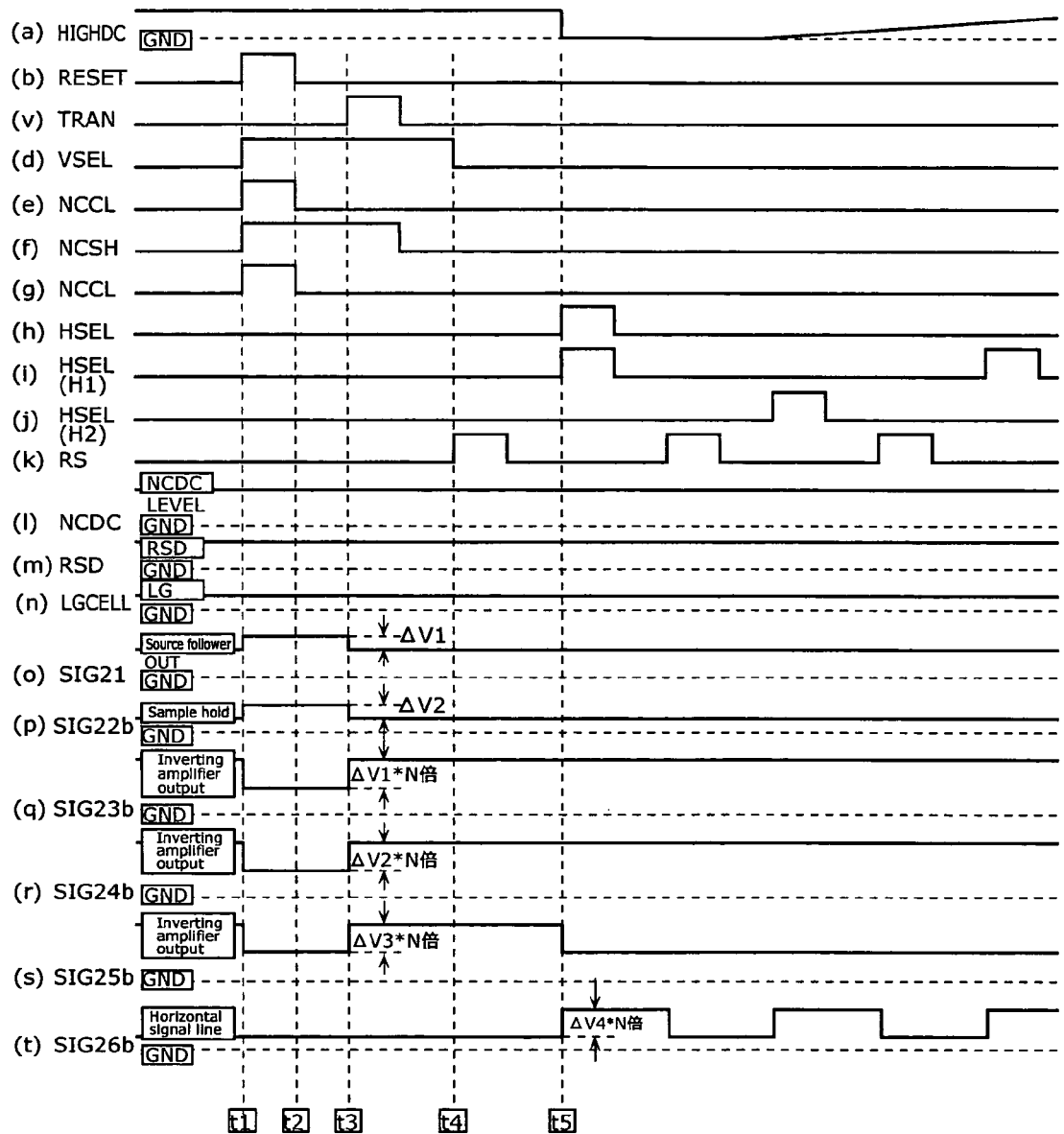
FIG. 19 A chart showing the driving timing of an NMOS solid state image pickup device 250.

FIG. 19 is a view showing the driving timing of the NMOS solid state image pickup device 250.

At the time t1, the reset transistor Q12 is turned on by the RESET pulse to supply the power supply voltage VDD to the floating diffusion FD. At this time, the row selection transistor Q14 is turned on by the VSEL pulse to input a signal (the node SIG21 of FIG. 18) from the source follower SF with the floating diffusion FD as the gate to the capacitor CA of the succeeding pixel signal amplification unit 60a. At this time, the amplifier reset transistor Q73 of the pixel signal amplification unit 60a is turned on by the AMPCL pulse, a boosting voltage is applied to the gate of the succeeding load transistor Q21, and this, together with the threshold voltage of the drive transistor Q72 of the inverting amplification column amplifier 71 with improved input and output characteristics, charges the capacitor CA. At this time, by turning on the amplifier reset transistor Q73 by the AMPCL pulse, the voltages at the drain and gate of the drive transistor Q72 are made the same, and the initial state is set by the threshold voltage of the drive transistor Q72 and the black level signal inputted to the pixel signal amplification unit 60a. Thereby, the variation in the threshold value of the drive transistor Q72 among the columns can be canceled. As for the AMPCL pulse, by supplying the pulse only within the vertical blanking period, the switching noise of the circuit can be significantly reduced.

Then, by turning on the sample hold transistor Q31 by the NCSH pulse, the output signal of the pixel signal amplification unit 60a is supplied to one end (the node SIG24b of FIG. 18) of the sample hold capacitor C42 of the noise cancellation unit 40. At this time, by turning on the clamp transistor Q42 by the NCCL pulse at the same time, a constant clamping voltage NCDC is supplied to the other end (the node SIG25b of FIG. 18) of the sample hold capacitor C42, whereby the sample hold capacitor C42 is charged.

At the time t2, the RESET pulse and the NCCL pulse are made low to thereby turn off the reset transistor Q12 and the clamp transistor Q42, and the transfer transistor Q11 is turned on by the TRAN pulse to transfer the charge accumulated in PD that converts light into an electric signal, to the floating diffusion FD. By the potential of the floating diffusion FD being changed by $\Delta V1$ from the VDD level, the signal from the source follower SF is also changed by $\Delta V2$, and the signal (the node SIG21 of FIG. 18) where the variation among the threshold values of the source followers SF is canceled is inputted to the succeeding pixel signal amplification unit 60a. At this time, the amplifier reset transistor Q73 of the pixel signal amplification unit 60a is off by the AMPCL pulse being low. Here, $\Delta V2$ is amplified to an N-fold signal by the N-fold inverting amplification column amplifier 71 of the pixel signal amplification unit 60a, and is supplied to one end (the node SIG24b of FIG. 18) of the sample hold capacitor C42 of the noise cancellation unit 40. Thereby, the signal (the node SIG25b of FIG. 18) at the other end of the sample hold capacitor C42 is also changed by a signal amount similar to being amplified by N times the $\Delta V2$. At this time, the signal change amount when a capacitance distribution with the clamp capacitor C41 connected to the same node occurs is a signal amount which is the product of the signal amplified by N times the $\Delta V2$ and C41/(C41+C42), and the signal amount can be increased to a voltage amplified by N times the signal change amount $\Delta V3$ in the conventional circuit.

Then, at the time t4, by turning on the horizontal line initialization transistor Q52 of the signal output unit 50b by the RS pulse, the horizontal signal line Lm (the node SIG26b of FIG. 18) is fixed at a constant voltage.

At the time t5, by turning on the column selection transistor Q51 of the signal output unit 50b by the HSEL pulse, the signal amplified by N times the $\Delta V3$ charged to the clamp capacitor C41 appears on the horizontal signal line Lm (the node SIG26b of FIG. 18) as a signal reduced to 0.8 to 0.9 times by passing through the source follower 51a.

However, since there is no influence of the capacitance distribution with the horizontal signal line parasitic capacitor C51 because of the addition of the source follower circuit 51a, the output signal amount can be made larger than the signal change amount $\Delta V4$ in the conventional circuit where the signal amount is the product of the signal amplified by N times the $\Delta V3$ and C42/(C42+C51).

As described above, by providing the circuit that prevents the capacitance distribution on the horizontal signal line Lm, higher sensitivity and lower noise in the final output signal can be achieved.

Ninth Embodiment

Figure 20:
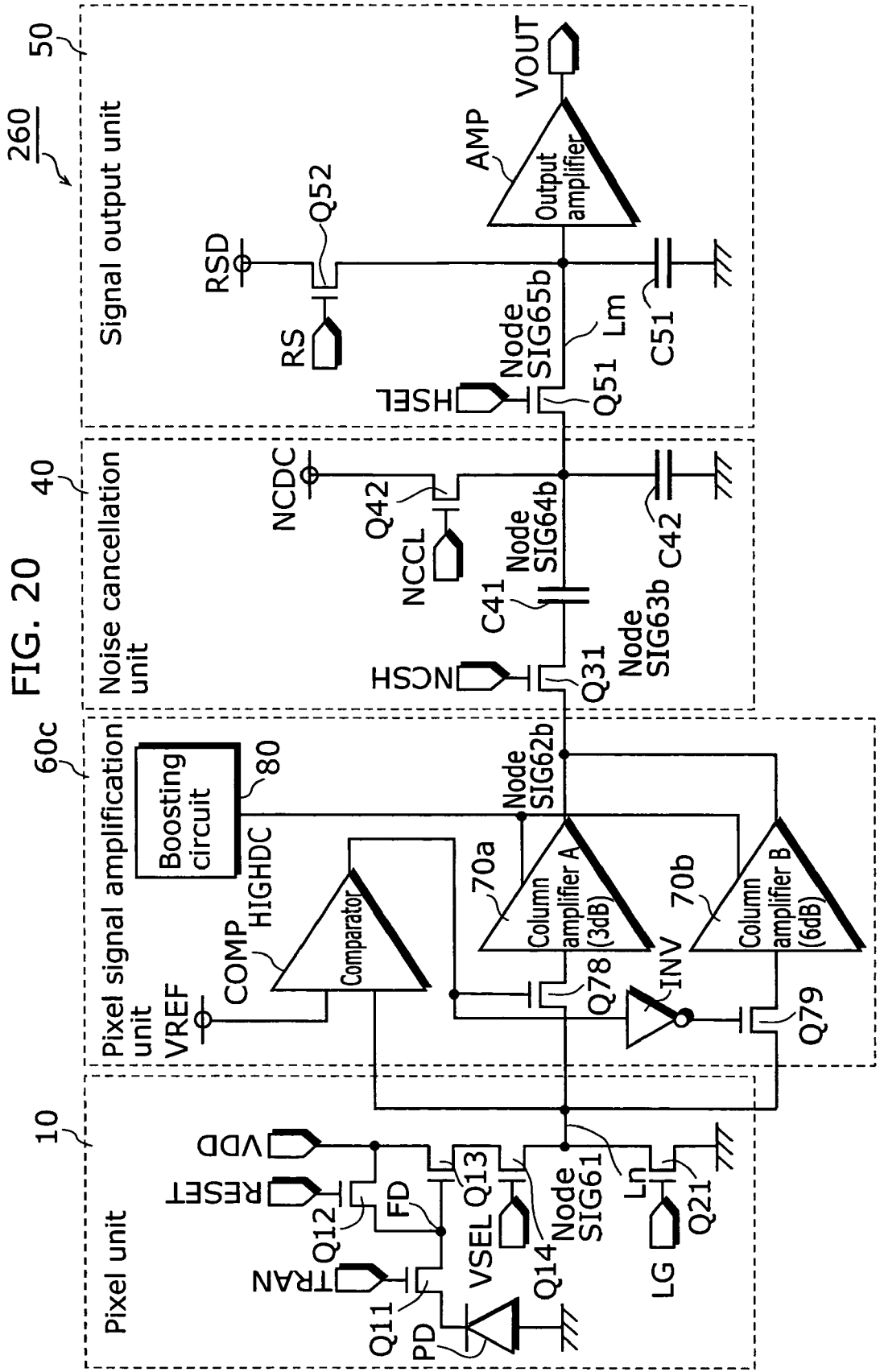
FIG. 20 A conceptual circuit diagram of a solid state image pickup device according to a ninth embodiment of the present invention.

FIG. 20 is a conceptual circuit diagram of a solid state image pickup device according to a ninth embodiment of the present invention.

A solid state image pickup device 260 is structured so that a pixel signal amplification unit 60c is capable of varying the amplification degree according to the level of the output voltage of the pixel unit 10.

In this structure example, the pixel signal amplification unit 60c has the column amplifiers 70a and 70b having different amplification degrees, switching transistors Q78 and Q79, the inverting circuit INV and the comparator COMP as well as the boosting circuit 80, and selects either one of the column amplifiers 70a and 70b according to the level of the output voltage of the pixel unit 10. A boosting voltage is applied to the column amplifiers 70a and 70b to improve the input and output characters.

The potential of the node SIG61 in the pixel unit 10 and VREF are compared by the comparator COMP, and when the potential of the node SIG61 is higher than VREF, the voltage of the node SIG61 is controlled by the output potential of the comparator COMP so as to be inputted to the input terminal of the column amplifier 70a and not to be inputted to the input terminal of the other column amplifier 70b. Therefore, the potential of the node SIG62b which is the output terminal of the column amplifiers 70a and 70b is determined by the output potential of the column amplifier 70a of the lower amplification degree.

Conversely, when the potential of the node SIG61 is lower than VREF, the voltage of the node SIG61 is controlled by the output potential of the comparator COMP so as to be inputted to the input terminal of the column amplifier 70b and not to be inputted to the input terminal of the other column amplifier 70a. Therefore, the potential of the node SIG62b which is the output terminal of the column amplifiers 70a and 70b is determined by the output voltage of the column amplifier 70b of the higher amplification degree.

As described above, the output signal can be made a more desirable one by largely amplifying it when the signal level of the pixel unit is low and amplifying it a little when the level is high.

The structure of the pixel signal amplification unit 60c is not limited to the structure described in the ninth embodiment; three or more column amplifiers may be included or the amplification degree may continuously vary according to the level of the output voltage of the pixel unit 10.

Tenth Embodiment

The device may be designed so that the frequency band of the column amplification unit (column amplifier 70) of the pixel signal amplification unit 60 is on a lower frequency side than the frequency band of the amplification unit formed of Q13 and Q21 of the pixel unit 10.

Thereby, the noise components caused in the pixel unit 10 is bandwidth-shaped by the pixel signal amplification unit 60, so that the noise components are reduced and excellent image quality is obtained.

Moreover, the frequency band of the noise cancellation unit 40 may be on a lower frequency side than the frequency band of the amplification unit formed of Q13 and Q21 of the pixel unit 10.

Thereby, the noise components caused in the pixel unit 10 is bandwidth-shaped by the noise cancellation unit 40, so that the noise components are reduced and excellent image quality is obtained.

Figure 21:
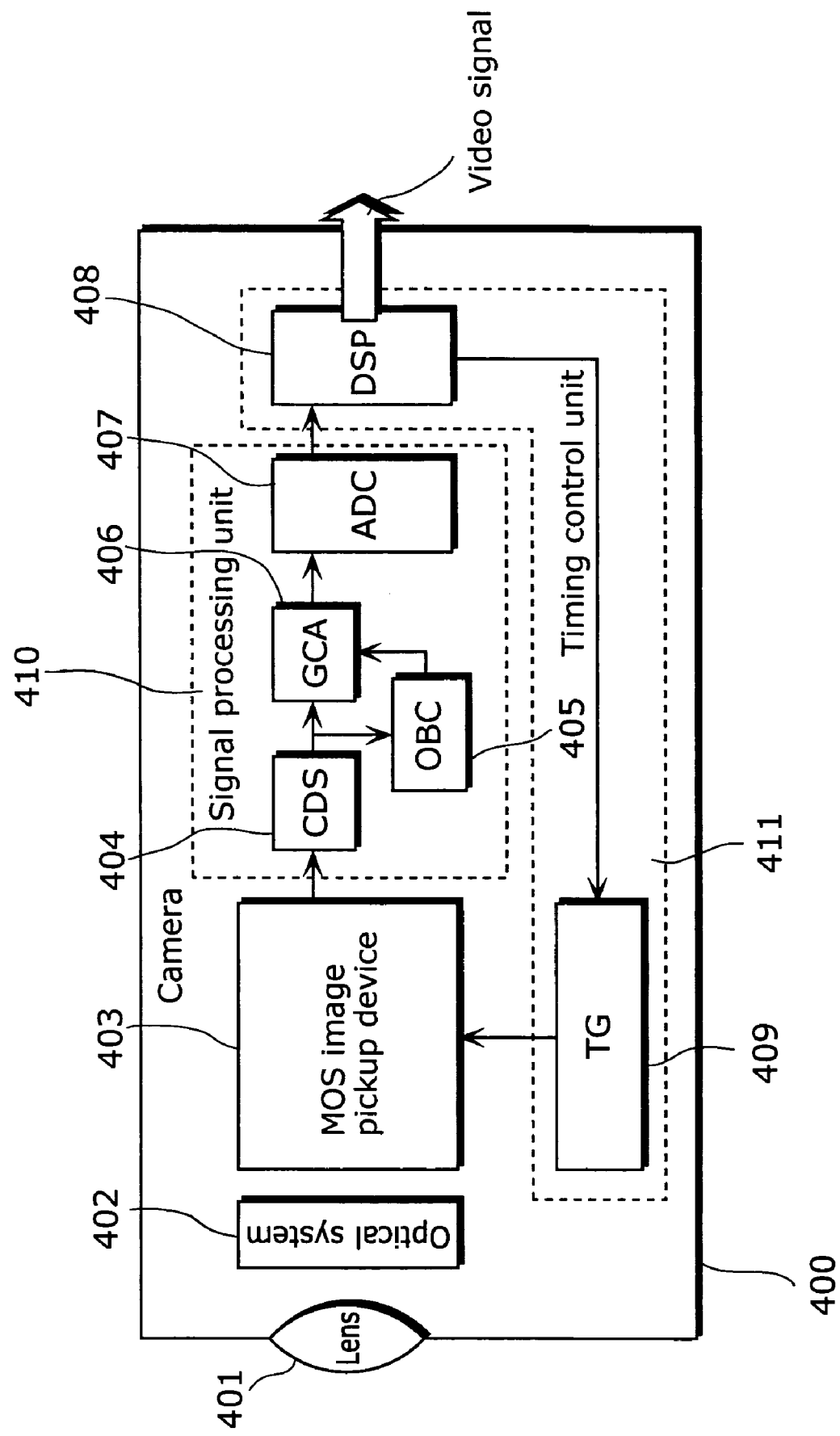
FIG. 21 A view showing the structure of a camera.

FIG. 21 is a view showing the structure of a camera using the solid state image pickup devices of the above-described first to tenth embodiments.

As shown in FIG. 21, the camera 400 has: a lens 401 that forms an optical image of the subject on the image pickup device; an optical system 402 such as a mirror or a shutter that performs optical processing of the optical image having passed through the lens 401; a MOS image pickup device 403 realized by the above-described solid state image pickup device; a signal processing unit 410; and a timing control unit 411. The timing control unit 411 includes: a CDS circuit 404 that obtains the difference between a field through signal outputted from the MOS image pickup device 403 and the output signal; an OB clamp circuit 405 that detects the signal of the OB level outputted from the CDS circuit 404; a GCA 406 that obtains the difference between the OB level and the signal level of the effective pixel and adjusts the gain of the difference; an ADC 407 that converts the analog signals outputted from the GCA 406 into digital signals. The timing control unit 411 includes: a DSP 408 that performs signal processing on the digital signals outputted from the ADC 407 and controls the driving timing; and a TG 409 that generates various driving pulses at various timings for the MOS image pickup device 403 on an instruction from the DSP 408.

According to the thus structured camera 400, by the MOS solid state image pickup device 403 realized by the above-described solid state image pickup devices, the amplification of noise components such as thermal noises and 1/f noises caused at the noise signal removal unit and succeeding elements is avoided and the S/N ratio is improved and by amplifying the pixel signal by N times by the column amplification unit, an effect similar to reducing the capacitance of the noise signal removal unit to approximately 1/N times can be obtained, so that a camera can be realized in which the increase in the chip area of the solid state image pickup device can be suppressed and further, the linearity of the sensitivity characteristic can be enhanced.

INDUSTRIAL APPLICABILITY

The solid state image pickup device according to the present invention is capable of achieving higher sensitivity, lower noise and reduction in chip area with low power consumption, is capable of obtaining an optical response with excellent linearity where saturation does not readily occur even when a large quantity of light is incident, and is suitable for, for example, digital cameras most suitable for photographing conditions where the light quantity largely changes such as being used both indoors and outdoors, camera phones, cameras provided on notebook computers, camera units connected to image processors, and image sensors.

The invention claimed is:

1. A solid state image pickup device for obtaining a two-dimensional image, comprising:
   a plurality of pixel units that are arranged two-dimensionally and each includes a photoelectric conversion unit operable to convert incident light into a charge and an amplification unit operable to convert the charge into a voltage and output the voltage;
   a plurality of noise signal removal units each provided for a column associated with a pixel and operable to remove a noise contained in the voltage outputted from the amplification unit of each of said pixel units corresponding to the column; and
   a plurality of column amplification units operable to amplify the voltage outputted from the amplification unit of each of said pixel units corresponding to the column and output the amplified voltage to each of said noise signal removal units corresponding to the column; and
   a boosting voltage application unit operable to apply, to a load circuit that each of said column amplification units has, a power supply voltage and a boosting voltage higher than the power supply voltage,
   wherein each of said pixel units, each of said noise signal removal units and each of said column amplification units are configured as an N-type MOS circuit.

2. The solid state image pickup device according to claim 1, further comprising:
   an impedance conversion unit operable to convert an impedance for the voltage outputted from each of said noise signal removal units; and
   an output signal amplification unit operable to amplify the voltage outputted from said impedance conversion unit,
   wherein said impedance conversion unit and said output signal amplification unit are configured as an N-type MOS circuit.

3. The solid state image pickup device according to claim 2,
   wherein said impedance conversion unit is a source follower circuit.

4. The solid state image pickup device according to claim 1,
   wherein each of said column amplification units comprises:
   an inverting amplifier; and
   a switching unit provided between an input terminal and an output terminal of said inverting amplifier.

5. The solid state image pickup device according to claim 1,
   wherein each of said column amplification units comprises:
   a plurality of column amplification circuits each having different amplification degrees; and
   a selection circuit that selects one of said column amplification circuits according to a level of the input voltage.

6. The solid state image pickup device according to claim 1,
   wherein each of said noise signal removal units uses a capacitance distribution method.

7. The solid state image pickup device according to claim 1,
   wherein each of said noise signal removal units has a capacitor, and
   the capacitor is an N-type MOS capacitor.

8. The solid state image pickup device according to claim 1, wherein said boosting voltage application unit is a charge pump circuit that boosts the power supply voltage by a charge pump method.

9. The solid state image pickup device according to claim 8,
wherein the charge pump circuit boosts the power supply voltage by using a driving pulse which selects the column.

10. The solid state image pickup device according to claim 1,
wherein said boosting voltage application unit is a bootstrap circuit that is provided within each of said column amplification units and applies, to the load circuit, the power supply voltage and the boosting voltage higher than the power supply voltage.

11. The solid state image pickup device according to claim 1,
wherein the load circuit is a first MOS transistor for load, and
the power supply voltage is applied to a drain of the first MOS transistor and the boosting voltage is applied to a gate of the first MOS transistor.

12. The solid state image pickup device according to claim 11,
wherein each of said column amplification units includes a second MOS transistor for driving,
a source of the first MOS transistor is connected to a drain of the second MOS transistor and the voltage outputted from the amplification unit of each of said pixel units corresponding to the column is applied to a gate of the second MOS transistor through a clamp capacitance, and
the voltage outputted from the amplification unit of each of said pixel units corresponding to the column is amplified by an amplification degree determined by a ratio between resistance values of the first and the second MOS transistors.

13. The solid state image pickup device according to claim 12,
wherein each of said column amplification units
changes the amplification degree according to an input level of the voltage outputted from the amplification unit of each of said pixel units corresponding to the column.

14. The solid state image pickup device according to claim 12,
wherein each of said column amplification units includes:
a plurality of column amplification units having different amplification degrees; and
a selection unit operable to select one of said column amplification units according to an input level of the voltage outputted from the amplification unit of each of said pixel units corresponding to the column.

15. The solid state image pickup device according to claim 12,
wherein each of said column amplification units
increase the amplification degree as an input level of the voltage outputted from the amplification unit of each of said pixel units corresponding to the column decreases.

16. The solid state image pickup device according to claim 12,
wherein each of said column amplification units further includes a third MOS transistor for making voltages at the drain and gate of the second MOS transistor the same, and
initial state is set by a threshold voltage of the second MOS transistor and a black level signal inputted to each of said column amplification units through the clamp capacitance from the amplification unit of each of said pixel units.

17. The solid state image pickup device according to claim 12,
wherein each of said column amplification units
includes an interruption unit operable to interrupt a drive current of the second MOS transistor except during a necessary operation period.

18. The solid state image pickup device according to claim 1,
further comprising an impedance conversion unit operable to convert an impedance for the voltage outputted from each of said noise signal removal units.

19. The solid state image pickup device according to claim 18,
wherein said impedance conversion unit is a source follower circuit structured by using an NMOS transistor.

20. The solid state image pickup device according to claim 1,
wherein each of said noise signal removal units has a capacitor, and
the capacitor is an N-type MOS capacitor.

21. The solid state image pickup device according to claim 1,
wherein each of said column amplification units is structured so as to be on a lower frequency side than a frequency band of the amplification unit of each of said pixel units, and bandwidth-shape a noise frequency.

22. The solid state image pickup device according to claim 1,
wherein each of said noise signal removal units is structured so as to be on a lower frequency side than a frequency band of the amplification unit of each of said pixel units, and bandwidth-shape a noise frequency.

23. A camera having said solid state image pickup device according to claim 1.

* * * * *

UNITED STATES PATENT AND TRADEMARK OFFICE
CERTIFICATE OF CORRECTION

PATENT NO. : 7,626,622 B2 Page 1 of 1
APPLICATION NO. : 10/584883
DATED : December 1, 2009
INVENTOR(S) : Kasuga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this

Twenty-first Day of December, 2010

David J. Kappos
*Director of the United States Patent and Trademark Office*